(12) United States Patent
Chang

(10) Patent No.: US 7,818,027 B2
(45) Date of Patent: Oct. 19, 2010

(54) PORTABLE TERMINAL AND APPARATUS AND METHOD FOR DRIVING THE SAME

(75) Inventor: Young Hoon Chang, Suwon (KR)

(73) Assignee: Hana Micron, Seoul (KR)

( * ) Notice: Subject to any disclaimer, the term of this patent is extended or adjusted under 35 U.S.C. 154(b) by 1268 days.

(21) Appl. No.: 11/349,556

(22) Filed: Feb. 6, 2006

(65) Prior Publication Data
US 2006/0197714 A1    Sep. 7, 2006

Related U.S. Application Data

(63) Continuation-in-part of application No. PCT/KR2005/000656, filed on Mar. 9, 2005.

(30) Foreign Application Priority Data
Mar. 12, 2004    (KR) .................. 10-2004-0016894

(51) Int. Cl.
*H04M 1/00*    (2006.01)
(52) U.S. Cl. ............. 455/550.1; 455/566; 455/575.3; 379/433.12; 379/433.13
(58) Field of Classification Search ........... 455/550.1, 455/566, 575.1, 575.3, 90.3, 145, 158.4; 379/433.12, 433.13; 160/36, 37, 202, 352, 160/240, 250, 260; 312/297
See application file for complete search history.

(56) References Cited

U.S. PATENT DOCUMENTS

| | | | |
|---|---|---|---|
| 6,003,052 A * | 12/1999 | Yamagata | 708/100 |
| 6,327,482 B1 * | 12/2001 | Miyashita | 455/566 |
| 6,931,265 B2 * | 8/2005 | Reyes et al. | 455/566 |
| 6,996,426 B2 * | 2/2006 | Granberg | 455/575.4 |
| 7,082,196 B2 * | 7/2006 | Kauhaniemi et al. | 379/447 |

FOREIGN PATENT DOCUMENTS

| | | |
|---|---|---|
| GB | 2390259 | 12/2003 |
| KR | 1020020012880 A | 2/2002 |

(Continued)

OTHER PUBLICATIONS

International Search Report—Korean Intellectual property office (ISA/KR), International Application No. PCT/KR2005/000656, Dated Aug. 8, 2005, 2 pages.

*Primary Examiner*—Lana N Le
*Assistant Examiner*—Ping Y Hsieh
(74) *Attorney, Agent, or Firm*—Paul F. Rusyn; Graybeal Jackson LLP

(57) ABSTRACT

A portable terminal is capable of large screen display and includes an apparatus for driving the same. The portable terminal includes a first display panel unit for displaying a first image, a second display panel unit for displaying a second image, a first and a second trajectory discs being positioned opposite each other at one side of the first display panel unit and formed with a plurality of trajectory grooves at one side thereof, and a folding slide door unit combined between the first display panel unit and the second display panel unit. The folding slide door unit is formed with guide protrusions respectively so as to be slidably inserted into the trajectory grooves of the first and the second trajectory discs at both lateral sides thereof, and includes a plurality of slide doors so as to be slidably folded along the trajectory grooves.

13 Claims, 23 Drawing Sheets

| | FOREIGN PATENT DOCUMENTS | |
|---|---|---|
| KR | 307362 | 3/2003 |
| KR | 20030037126 | 5/2003 |
| KR | 100460299 B1 | 11/2004 |in

| WO | 2005055454 A1 | 6/2005 |
| WO | WO 2005/088845 A1 | 9/2005 |

\* cited by examiner

PORTABLE TERMINAL AND APPARATUS AND METHOD FOR DRIVING THE SAME

PRIORITY CLAIM

The present application is a Continuation-in-Part of International Patent Application No. PCT/KR2005/000656, filed Mar. 9, 2005, which application claims the benefit of Korean Patent Application No. 2004-0016894, filed Mar. 12, 2004; all of the foregoing applications are incorporated herein by reference in their entireties.

TECHNICAL FIELD OF THE INVENTION

The present invention relates to a portable terminal, and more particularly, to a portable terminal having a large display screen and an apparatus and method for driving the same.

BACKGROUND OF THE INVENTION

In general, a portable terminal is a device, commonly called a mobile communication terminal such as a digital phone, cellular phone, PCS phone, etc., or portable digital terminal such as a personal digital assistant (PDA), a small-sized notebook computer, etc. Typically, it is connected with a wireless communication link for providing various digital content such as audio and image information to users.

Portable terminals have been improved with the aim of high sensitivity and size/weight reduction for maximizing portability, and this trend may be found when we see how mobile communication terminals, representative of such portable terminals, have been developed.

In other words, bar-type or flip-type terminals among early mobile communication terminals are rarely used because such terminals have difficulty in dimensional expansion as well as relatively large size and weight. Sliding folder-type or folder-type terminals are widely used due to small size and weight as well as dimensional expansion capability.

On the other hand, wireless data services are becoming popular and there is a general trend that multimedia content providing functions of portable terminals are becoming more important than classical functions provided by such portable terminals, such as telephone call functions in case of mobile communication terminal, and data input functions in case of PDAs.

In order to achieve such multimedia content providing functionality, and in particular image content providing functionality point an important factor is how well image content received from a communication network is displayed through a display panel or unit of a portable terminal.

As mentioned above, however, current portable terminals are aiming to be small size and light weight. Accordingly, there exists a problem that content including high quality images cannot be displayed on the portable terminal due to the restricted size of a conventional display panel thereof.

Hereinafter, dual display panel folder-type terminal having the most developed and popularized shape among conventional portable terminals will be described with the problem of the display panel structure.

FIG. 1 and FIG. 2 are perspective views respectively illustrating an external shape seen from the inside or the outside when a dual display panel folder-type terminal having two display panels is unfolded. And FIG. 3 is a block diagram showing a module structure in the terminal shown in FIG. 1 and FIG. 2.

As shown in FIG. 1 and FIG. 2, dual display panel folder-type terminal 10 includes a main body 20 and a folder 30 combined with the main body 20 in such a manner that the folder 30 is open or closed through a hinge, and main display panel 31 and sub-display panel 32, each of which is a liquid crystal screen, are provided at the inner and outer surface of the folder 30 respectively.

Furthermore, the display module includes the main display panel 31, a main scan driver 41, a main data driver 40, a main display panel controller 42, the sub-display panel 32, a sub-scan driver 51, a sub-data driver 50, and a sub-display panel controller 52, as shown in FIG. 3.

Here, scan drivers 41, 51 and data drivers 40, 50, as mentioned above, mean circuit devices for driving the rows and columns of an FPD (Flat Panel Display) in which light-emitting devices such as LCD, PDP, OLED or the like are arranged in rows and columns, and operated in the form of a matrix. Sometimes the scan drivers 41, 51 are called gate drivers, and data drivers 40, 50 are called source drivers.

The main display panel 31 has pixels arranged in a matrix form having a plurality of row lines and column lines, and is controlled by main scan driver 41, main data driver 40, and main display panel controller 42.

Furthermore, main scan driver 41 scans row lines (Y-axis) of main display panel 31 sequentially, and main data driver 40 converts an image data into electrical voltage or current, and applies it to the column lines (X-axis) of main display panel 31.

Main display panel controller 42 controls the main data driver 40 and main scan driver 41 by providing them with image data signals and scan signals, respectively.

On the other hand, sub-display panel 32, sub-scan driver 51, sub-data driver 50 and sub-display panel controller 52 will individually perform the same function as that of the above-mentioned main display related modules 31, 41, 40, 42.

However, main display panel 31 and sub-display panel 32 of the dual display panel folder-type terminal 10 are mounted on the inner and outer sides of the folder 30, respectively, in an independent manner, and have no mutual link function with each other. Typically, the main display panel 31 is wholly responsible for multimedia content display function, and the sub-display panel 32 performs only a simple function such as guidance window display.

Accordingly, it is impossible to provide a sufficient screen size and an ideal aspect ratio of 16:9 because the size of main display panel 31 is restricted by the size of the folder 30.

In other words, the size of main display panel 31 of the folder 30 is small, so it has difficulty in displaying detail parts of image. Also, in case that a large screen image such as high definition television (HDTV) multimedia content having the ratio 16:9 is to be displayed, the original 16:9 screen image cannot be supported. Accordingly, the image must be adjusted to the shape of main display panel 31 of the portable terminal 10, so there is a problem in which digital content reproducibility decreases remarkably and the shape of screen is changed.

Furthermore, even in the display module construction, display panel controllers 42, 52 for controlling panels 31, 32 are respectively connected to main display panel 31 and sub-display panel 32, so another problem is the relatively large circuit area required for such duplicate circuits and the associated power consumption Therefore, there is a need for large screen display devices which are capable of displaying large screen images with an aspect ratio 16:9 on mobile communication terminals or small-sized portable terminals such as PDAs or the like.

SUMMARY OF THE INVENTION

The present invention is made in view of the above background, and one aspect of the invention is to provide a large screen display device for a portable terminal in which one large screen without having any distortion can be displayed by means of a main display panel and a sub-display panel using a hinge joint, thereby allowing the display of a large screen with an ideal aspect ratio for the portable terminal.

Furthermore, another aspect of the invention controls a main display panel and a sub-display panel by means of a single controller, thereby providing a structure in which a printed circuit board (PCB) film can be laid out effectively in the terminal.

Furthermore, still another aspect of the invention the limit of large screen display caused by two display panels is overcame by combining a sub-display panel with another sub-display panel through a hinge, and controlling a main display panel and a plurality of sub-display panels by means of a single controller, and providing an insertion structure of PCB film based on this structure.

According to one aspect of the present invention, a portable terminal comprises a first display panel unit for displaying a first image; a second display panel unit for displaying a second image; a first and a second trajectory discs being positioned opposite each other at one side of the first display panel unit, and formed with a plurality of trajectory grooves at one side thereof; and a folding slide door unit comprising a plurality of slide doors having guide protrusions formed at both lateral sides thereof to be slidably inserted into the trajectory grooves of the first and the second trajectory discs, and slidably folded along the trajectory grooves, wherein the folding slide door unit is connected between the first display panel unit and the second display panel unit.

A portable terminal according to another aspect of the present invention comprises a first panel unit on which main display panel is mounted; a second panel unit on which sub-display panel is mounted; a first and a second trajectory discs being positioned opposite each other at one side of the first panel unit, and formed with a plurality of trajectory grooves at one side thereof; and a folding slide door unit comprising a plurality of slide doors having guide protrusions formed at both lateral sides thereof to be slidably inserted into the trajectory grooves of the first and the second trajectory discs, and slidably folded along the trajectory grooves, wherein the folding slide door unit is connected between the first panel unit and the second panel unit.

A driving apparatus of a portable terminal according to another aspect of the present invention comprises a first panel unit on which a first display panel is mounted, a second panel unit on which the second display panel is mounted, and a hinge unit for connecting the second panel unit to the first panel unit, and the driving apparatus comprises a first film portion on which a first driver for driving the first display panel is mounted, and inserted into the first panel unit; a second film portion on which a second driver for driving the second display panel is mounted, and inserted into the second panel unit; and a connection portion inserted into the hinge unit and connected with the first film portion and the second film portion, wherein a first and a second folding lines are formed in the first and the second film portions respectively in parallel with the connection portion.

According to one aspect of the present invention, a large screen is formed by combining a main display panel unit having a main display panel and a sub-display panel unit having a sub-display panel through a hinge unit which comprises a trajectory disc and a plurality of folding slide doors so that the sub-display panel unit can be folded or unfolded. Accordingly, a large screen is provided when the sub-display panel is unfolded. Therefore, it is possible to provide high quality service with an ideal aspect ratio on a large screen when multimedia content is displayed by the portable terminal, such as various mobile communication terminals, PDA or the like. Moreover, it is possible to control main display panel with its display modules and sub-display panel with its display modules by a single controller, thereby providing a layout structure in which a single PCB film for their connections can be inserted effectively into the terminal.

Furthermore, the limit of a single large screen display is overcame by combining the sub-display panel with the main display panel unit through a hinge unit with another sub-display panel through another hinge unit to display an expanded large screen.

DETAILED DESCRIPTION OF THE INVENTION

Figure 1:
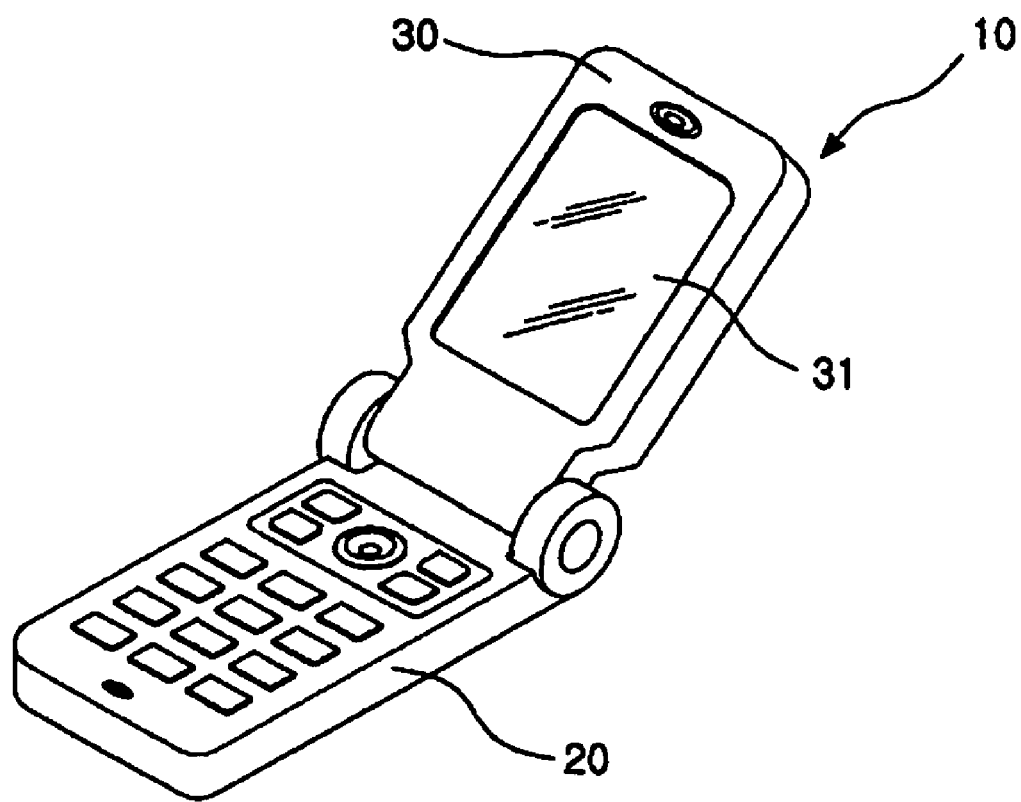
FIG. 1 is a perspective external view of a conventional dual display panel folder-type terminal having two display panels, when the folder is unfolded and the terminal is seen from the inside.
Figure 2:
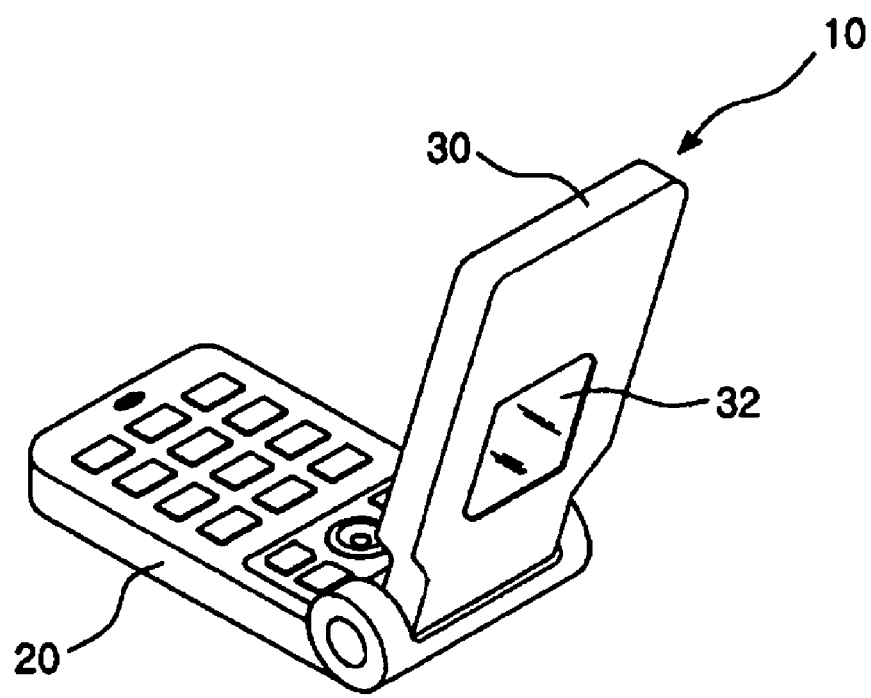
FIG. 2 is a perspective external view of a conventional dual display panel folder-type terminal having two display panels, when the folder is unfolded and the terminal is seen from the outside.
Figure 3:
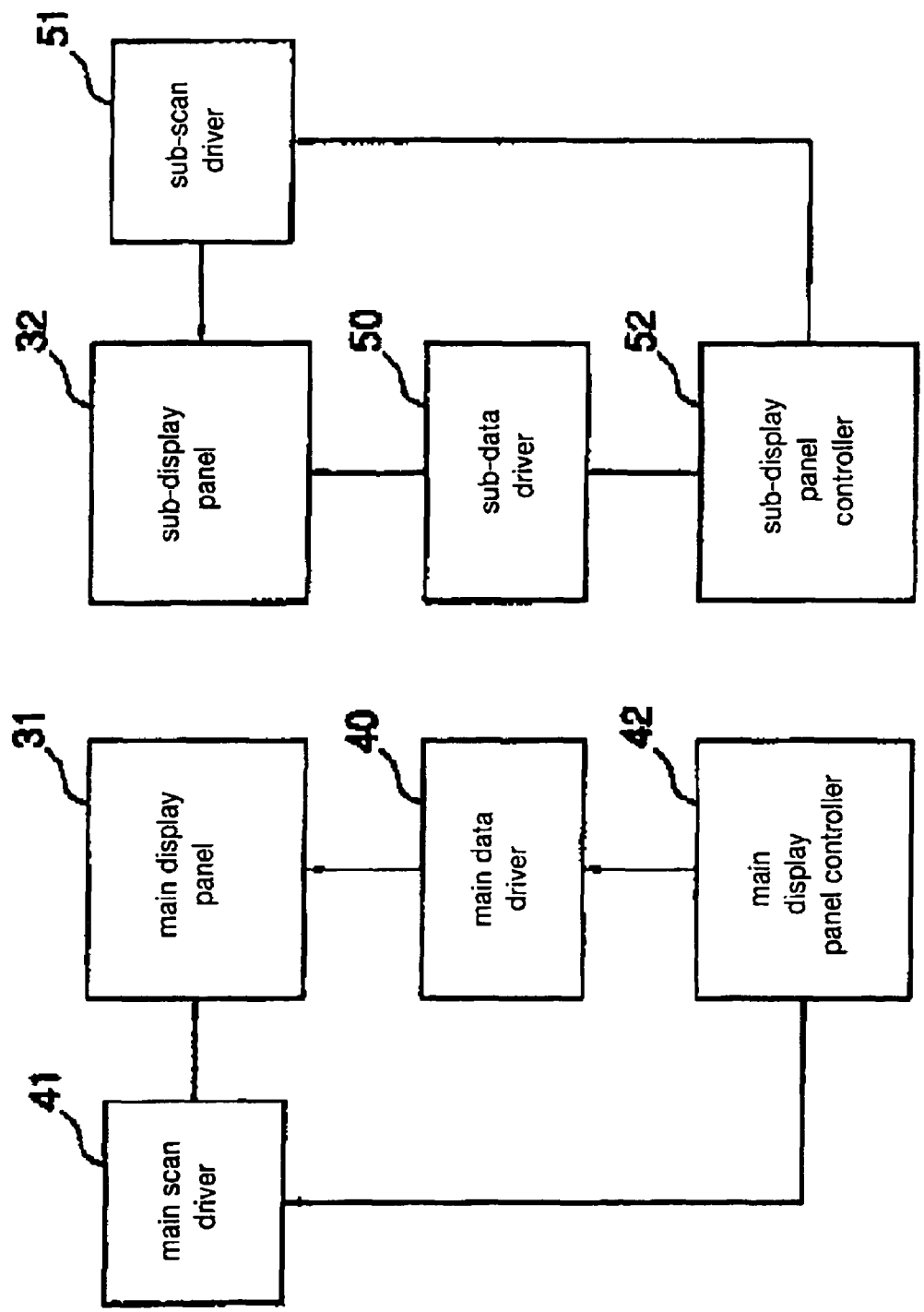
FIG. 3 is a block diagram of a conventional display module in the dual display panel folder-type terminal shown in FIGS. 1 and 2.

Hereinafter, embodiments according to the invention will be described in detail with reference to the accompanying drawings. The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

In the following detailed description, when a part is connected to another part, it may include a case that they are directly connected to each other, as well as a case that they are electrically connected to each other by interposing another element in the middle. To clarify the present invention, parts which are not described in the specification are omitted, and parts for which similar descriptions are provided in the specification have the same reference numerals.

Figure 4:
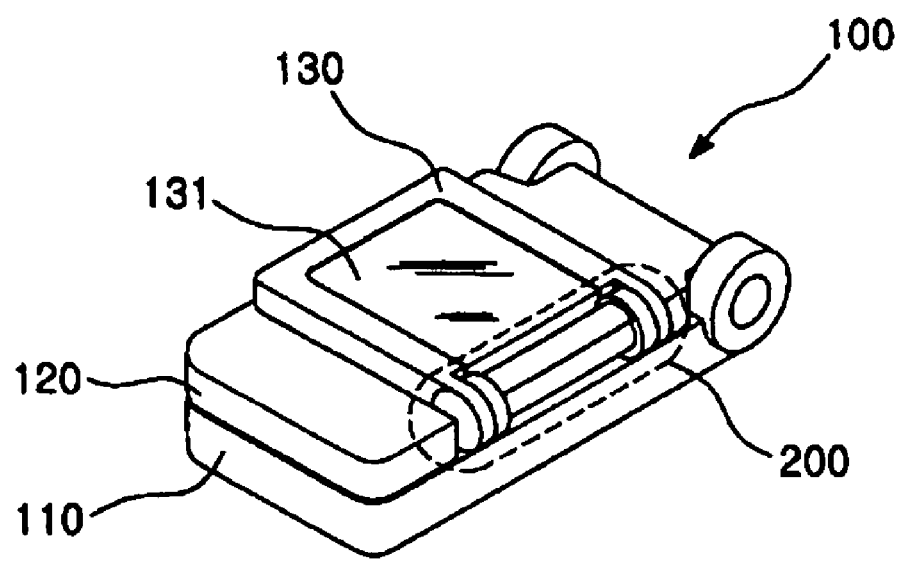
FIG. 4 is a perspective view of a dual display panel folder-type terminal having a large screen display device when the terminal is folded according to one embodiment of the present invention.
Figure 5:
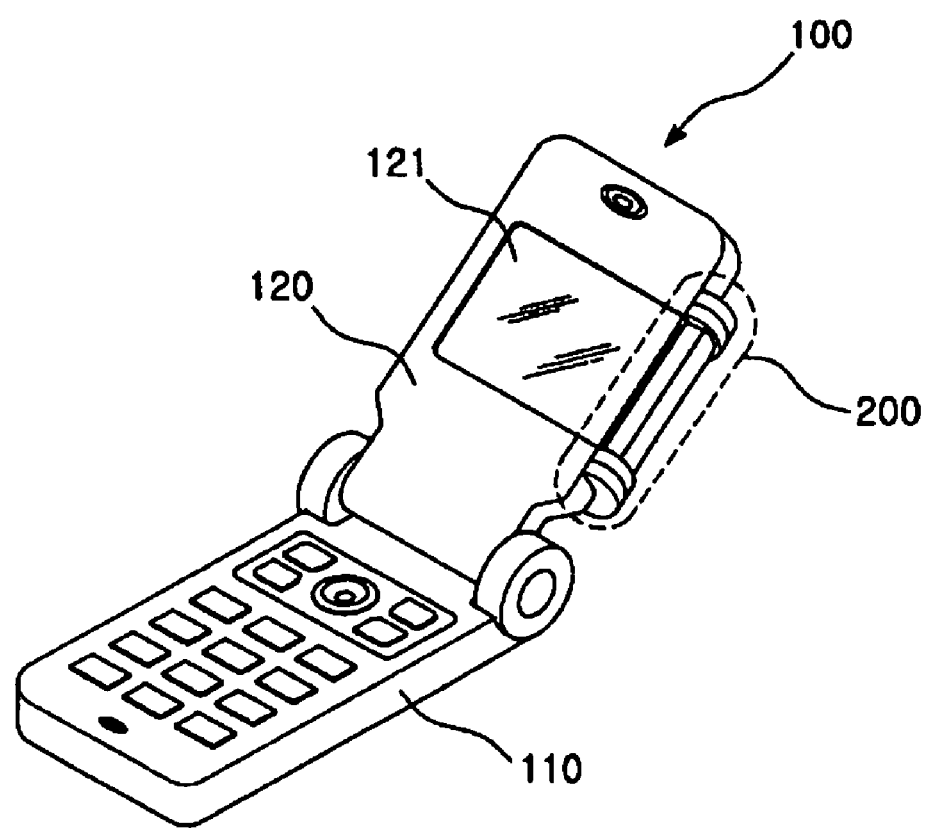
FIG. 5 is a perspective view of the dual display panel folder-type terminal that is seen from the inside when main display panel unit shown in FIG. 4 is unfolded.
Figure 6:
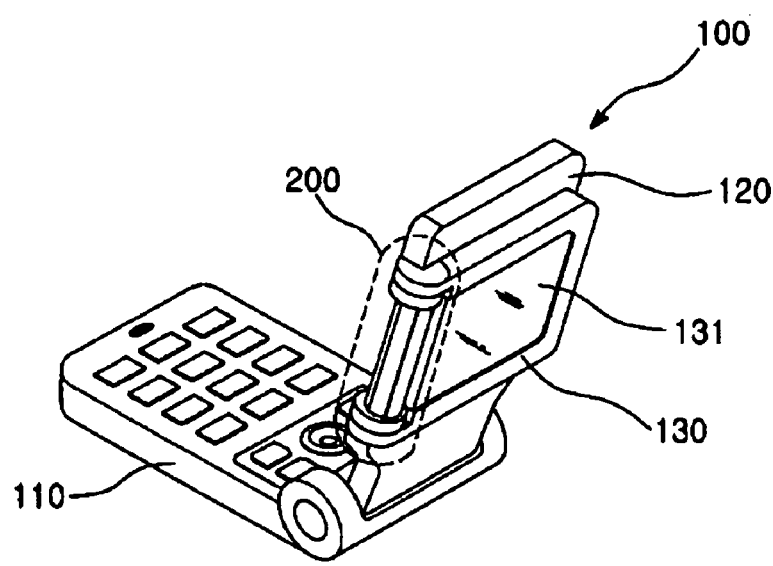
FIG. 6 is a perspective view of the dual display panel folder-type terminal that is seen from the outside when main display panel unit shown in FIG. 4 is unfolded.
Figure 7:
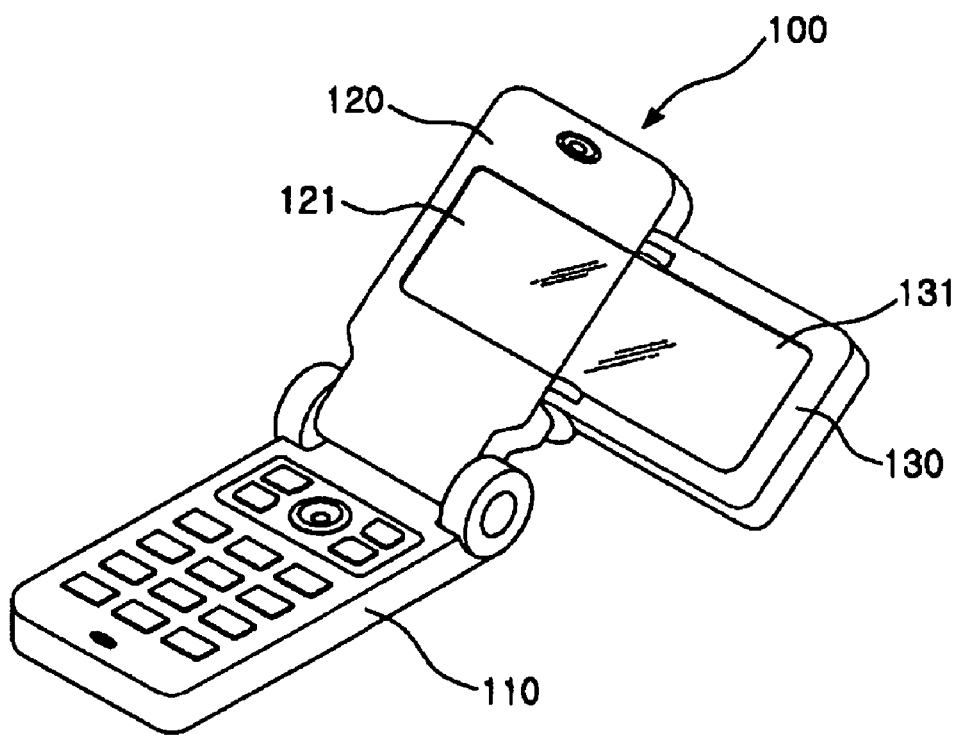
FIG. 7 is a perspective view of the dual display panel folder-type terminal that is seen from the inside when a sub-display panel unit is unfolded from the main display panel unit shown in FIG. 5.
Figure 8:
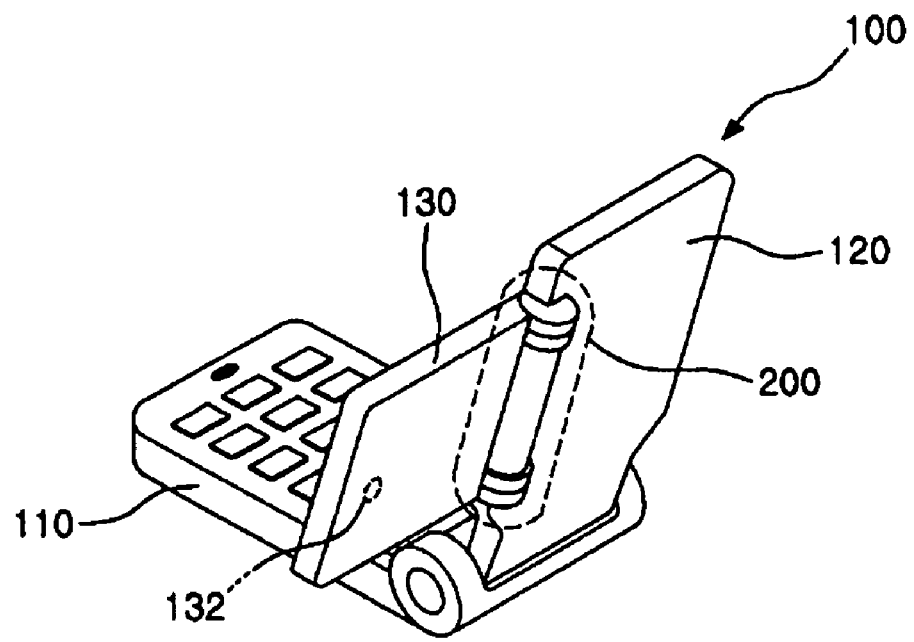
FIG. 8 is a perspective view of the dual display panel folder-type terminal that is seen from the outside when a sub-display panel unit is unfolded from the main display panel unit shown in FIG. 5.

FIGS. 4 to 8 show a portable terminal according to an embodiment of the present invention. Specifically, FIG. 4 is a perspective view of the portable terminal when main display panel unit is folded, and FIG. 5 is a perspective view of the portable terminal that is seen from the inside when main display panel unit is unfolded from the main body. Furthermore, FIG. 6 is a perspective view of the portable terminal that is seen from the outside when the main display panel unit is unfolded from the main body, and FIG. 7 is a perspective view of the portable terminal that is seen from the inside when a sub-display panel unit mounted on the main display panel unit is unfolded, and FIG. 8 is a perspective view of the portable terminal that is seen from the outside when a sub-display panel mounted on the main display panel unit is unfolded.

As shown, portable terminal 100 according to an embodiment of the present invention comprises a main display panel unit 120, a hinge unit 200, and a sub-display panel unit 130. The main display panel unit 120 is combined with a main body 110 of the terminal through a hinge so as to be folded as shown in FIG. 4 or unfolded as shown in FIGS. 5 to 8.

Here, the inner surface of main display panel unit 120 is provided with main display panel unit 121 having a display liquid crystal screen, and sub-display panel unit 130 is combined with one side of the main display panel unit 120 through a hinge unit 200 in such a manner that it can be folded over the outer surface of the main display panel unit 120 as shown in FIG. 6 when it is not used, and unfolded as shown in FIG. 7 while displaying a large screen.

The sub-display panel 131 having a display liquid crystal screen is provided on the outer surface of the sub-display panel unit 130, and the sub-display panel 131 is adhered closely to the main display panel 121 in order to display contents on the screen while displaying a large screen. Furthermore, as shown in FIG. 8, a sensor 132 for determining whether the sub-display panel unit 130 is folded or not is provided at an inner side of the sub-display panel unit 130.

Figure 9:
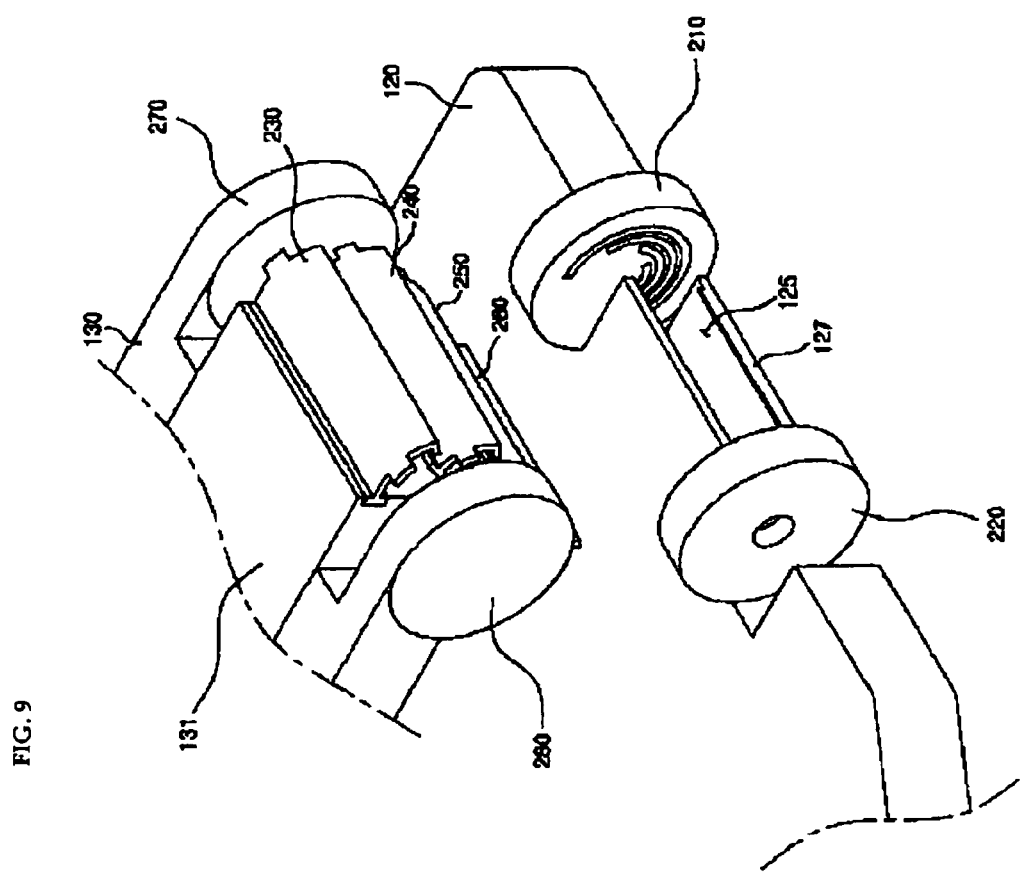
FIG. 9 is an exploded perspective view of a hinge unit shown in FIGS. 3 to 8.
Figure 10:
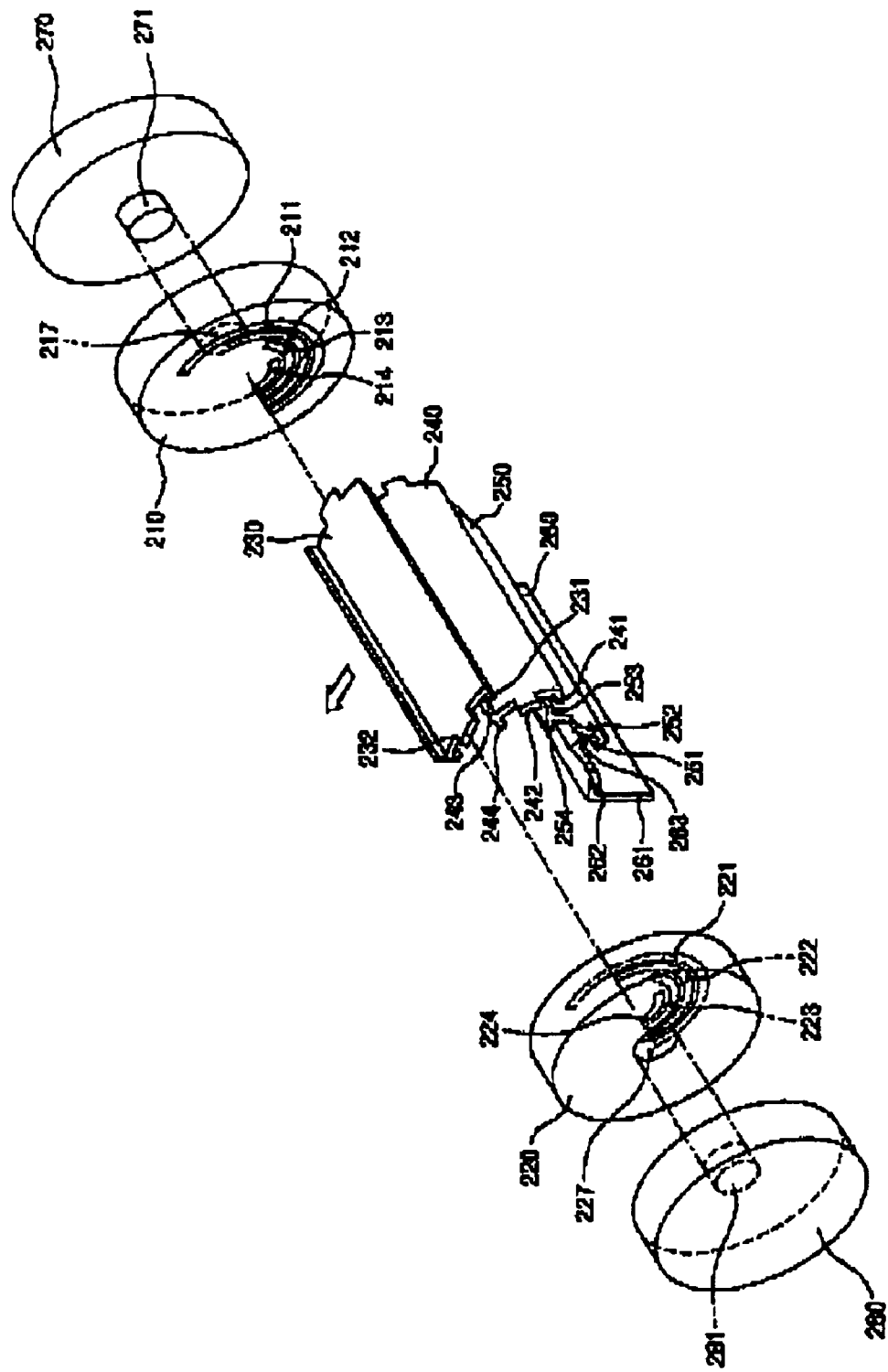
FIG. 10 is a partial perspective view of the construction and combining structure of trajectory discs, folding slide doors, and rotary supporting discs shown in FIG. 9.
Figure 11:
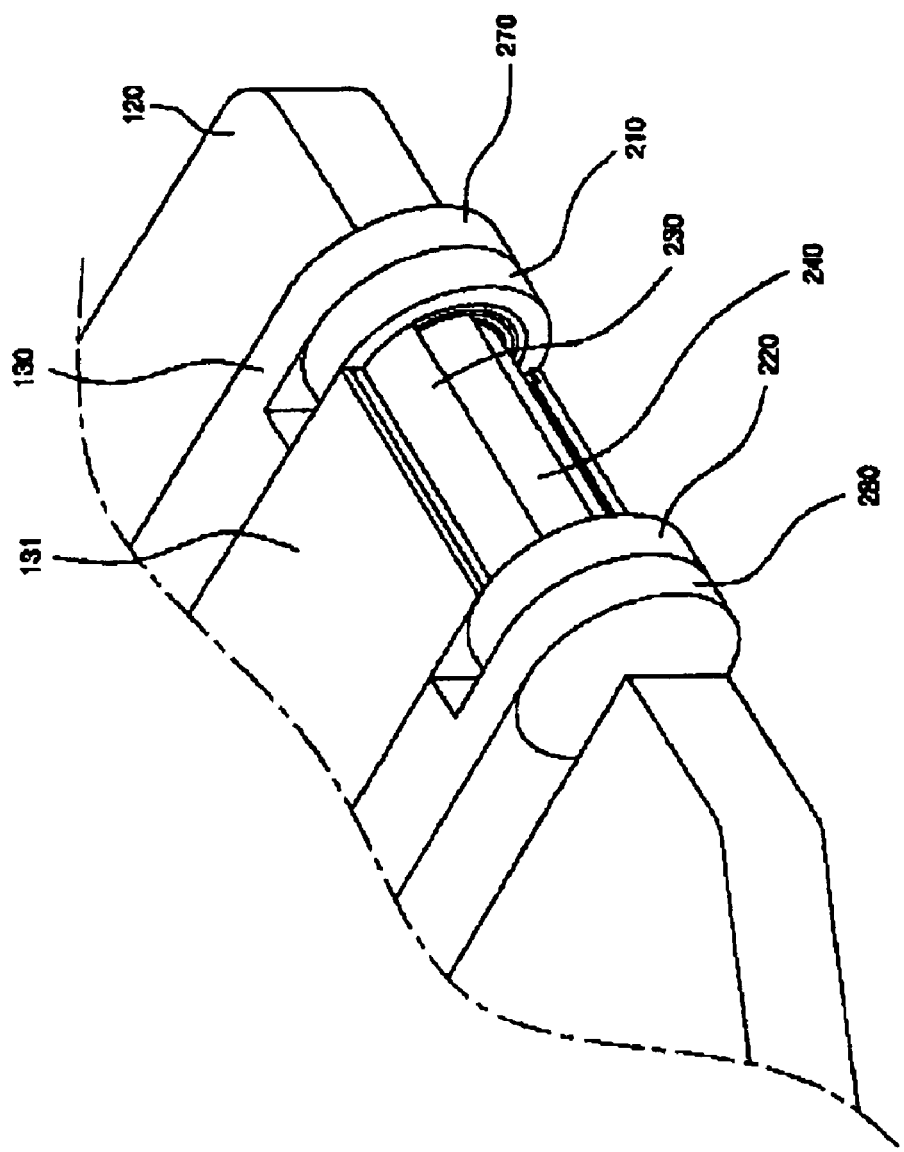
FIG. 11 is a perspective view showing a shape in which the elements of FIG. 10 are combined together.

FIGS. 9 to 11 show the construction of a hinge unit 200 of FIG. 3 to 8, and FIG. 9 is a exploded perspective view of the overall construction of a hinge unit, and FIG. 10 is a partial perspective view showing the construction and combining structure of trajectory discs, folding slide doors, and rotary supporting discs shown in FIG. 9, and FIG. 11 is a perspective view showing a shape in which the elements of FIG. 10 are combined together.

As illustrated in FIG. 9, the hinge unit 200 includes a first trajectory disc 210, a second trajectory disc 220, a first rotary supporting disc 270, a second rotary supporting disc 280, a first folding slide door 230, a second folding slide door 240, a third folding slide door 250, a fourth folding slide door 260, and a folding slide door inserting groove 125.

Hereinafter, the construction of a hinge unit according to an embodiment of the present invention will be described in detail.

The first trajectory disc 210 of FIG. 9 is formed in a disc shape on a lateral side of the main display panel unit 120, and as shown in FIG. 10 a first rotary supporting disc inserting groove 217 is formed in the center of the outer surface thereof, and a plurality of trajectory grooves 211-214 for guiding the motion of the respective folding slide doors 230-260 so as to fold or unfold the sub-display panel unit 130 are formed at each corresponding position of the folding slide doors 230-260 on the inner surface thereof.

In other words, it is formed with a first trajectory groove 211 for guiding the first folding slide door 230, a second trajectory groove 212 for guiding the second folding slide door 240, a third trajectory groove 213 for guiding the third folding slide door 250, and a fourth trajectory groove 214 for guiding the fourth folding slide door 260.

The second trajectory disc 220 is formed in a disc shape at each position opposite the first trajectory disc 210 on the lateral side of the main display panel unit 120, and a second rotary supporting disc inserting groove 227 is formed in the center of the outer surface thereof, and a plurality of trajectory grooves 211-214 for guiding the motion of the respective folding slide doors 230-260 are formed at each position of the corresponding folding slide doors 230-260 on the inner surface thereof.

In other words, it is formed with a fifth trajectory groove 221 for guiding the first folding slide door 230, a sixth trajectory groove 222 for guiding the second folding slide door 240, a seventh trajectory groove 223 for guiding the third folding slide door 250, and a eighth trajectory groove 224 for guiding the fourth folding slide door 260.

The first rotary supporting disc 270 is formed in a disc shape identical to the first trajectory disc 210 on a lateral side of the sub-display panel unit 130 as illustrated in FIG. 9, and an inserting protrusion 271 to be inserted into the first rotary supporting disc inserting groove 217 which is formed on the first trajectory disc 210 is formed in the center thereof as illustrated in FIG. 10.

The second rotary supporting disc 280 is formed in a disc shape identical to the second trajectory disc 220 on the lateral side of the sub-display panel unit 130 facing the first rotary supporting disc 270, and an inserting protrusion 281 to be inserted into the second rotary supporting disc inserting groove 227 which is formed on the 2 trajectory disc 220 is formed in the center thereof.

Furthermore, the first and the second trajectory discs 210, 220 and the first and the second rotary supporting discs 270, 280 are mounted with one another in such a manner that each center thereof is formed at the edge of a lateral side of the main and sub-display panel units 120, 130 to form a pivot of the hinge unit 200 at the edge of the main and sub-display panel units 120, 130.

Here, grooves are formed on the outer surface of the part where the first trajectory disc 210 and the second trajectory disc 220 of the main display panel unit 120 are formed, and on the inner surface of the part where the first rotary supporting disc 270 and the second rotary supporting disc 280 of the sub-display panel unit 130 are formed, as shown in FIG. 9, to combine the first rotary supporting disc 270 and the second rotary supporting disc 280 with the outer surface of the first trajectory disc 210 and the second trajectory disc 220 formed on the main display panel unit, respectively.

As for the first folding slide door 230, one end thereof is connected with the sub-display panel unit 130, and the inner side of the other end thereof is formed with a hook member 231, and both lateral ends are formed with guide protrusions 232 so as to be slidably inserted into a first trajectory groove 211 which is formed on the first trajectory disc 210 and a fifth trajectory groove 221 which is formed on the second trajectory disc 220 respectively.

As for the second folding slide door 240, the outer side of one end thereof is formed with a bridging ledge 243 so as to be bridged with the hook member 231 which is formed on the first folding slide door 230, and one end and the inner side of the other end thereof are formed with hook members 244, 241, and both lateral ends are formed with guide protrusions 242 so as to be slidably inserted into a second trajectory groove 212 which is formed on the first trajectory disc 210 and a sixth trajectory groove 222 which is formed on the second trajectory disc 220 respectively.

As for the third folding slide door 250, the outer side of one end thereof is formed with bridging ledges 253 so as to be bridged with the hook members 244, 241 which are formed on the second folding slide door 240, and one end and the inner side of the other end thereof are formed with hook members 254, 251, and both lateral ends are formed with guide protrusions 252 so as to be slidably inserted into a third trajectory groove 213 which is formed on the first trajectory disc 210 and a seventh trajectory groove 223 which is formed on the second trajectory disc 220 respectively.

As for the fourth folding slide door 260, the outer side of one end thereof is formed with bridging ledges 263 so as to be bridged with the hook members 254, 251 which are formed on the third folding slide door 250, and the outer side of the other end thereof are formed with a hook member 261 so as to be bridged with a bridging ledge (FIG. 9) 127 of the folding slide door inserting groove 125, and both lateral ends are formed with guide protrusions 262 so as to be slidably inserted into a fourth trajectory groove 214 which is formed on the first trajectory disc 210 and an eight trajectory groove 224 which is formed on the second trajectory disc 220 respectively.

Therefore, the first folding slide door 230 can move slidably along the trajectory guided by the first trajectory groove 211 and the fifth trajectory groove 221 when the guide protrusion 232 is inserted between the first trajectory groove 211 and the fifth trajectory groove 221. Similarly, the second folding slide door 240, the third folding slide door 250 and the fourth folding slide door 260 can move slidably when they are respectively inserted between the second trajectory groove 212 and the sixth trajectory groove 222, between the third trajectory groove 213 and the seventh trajectory groove 223, and between the fourth trajectory groove 214 and the eighth trajectory groove 224, and as a result sub-display panel unit 130 connected with the first folding slide door 230 is unfolded at a lateral side of main display panel unit 120 or folded over the outer surface of main display panel unit 120.

On the other hand, the folding slide door inserting groove 125 is formed in such a manner that the folding slide doors 230-260 can be inserted between the first trajectory disc 210 and the second trajectory disc 220 formed at a lateral side of main display panel unit 120, and the bridging ledge 127 is formed so as to be bridged with the hook member 261 which is formed on the fourth folding slide door 260 at one side of the folding slide door inserting groove 125.

When the elements of FIG. 10 are combined together, a shape as shown in FIG. 11 will be formed, and it is seen that each of the folding slide doors 230-260 is slidably inserted between the first trajectory disc 210 and the second trajectory disc 220 formed at a lateral side of main display panel unit 120, and the first rotary supporting disc 270 and the second rotary supporting disc 280 formed at a lateral side of sub-display panel unit 130 are rotationally combined with the outer surface of the first trajectory disc 210 and the second trajectory disc 220.

Figure 12:
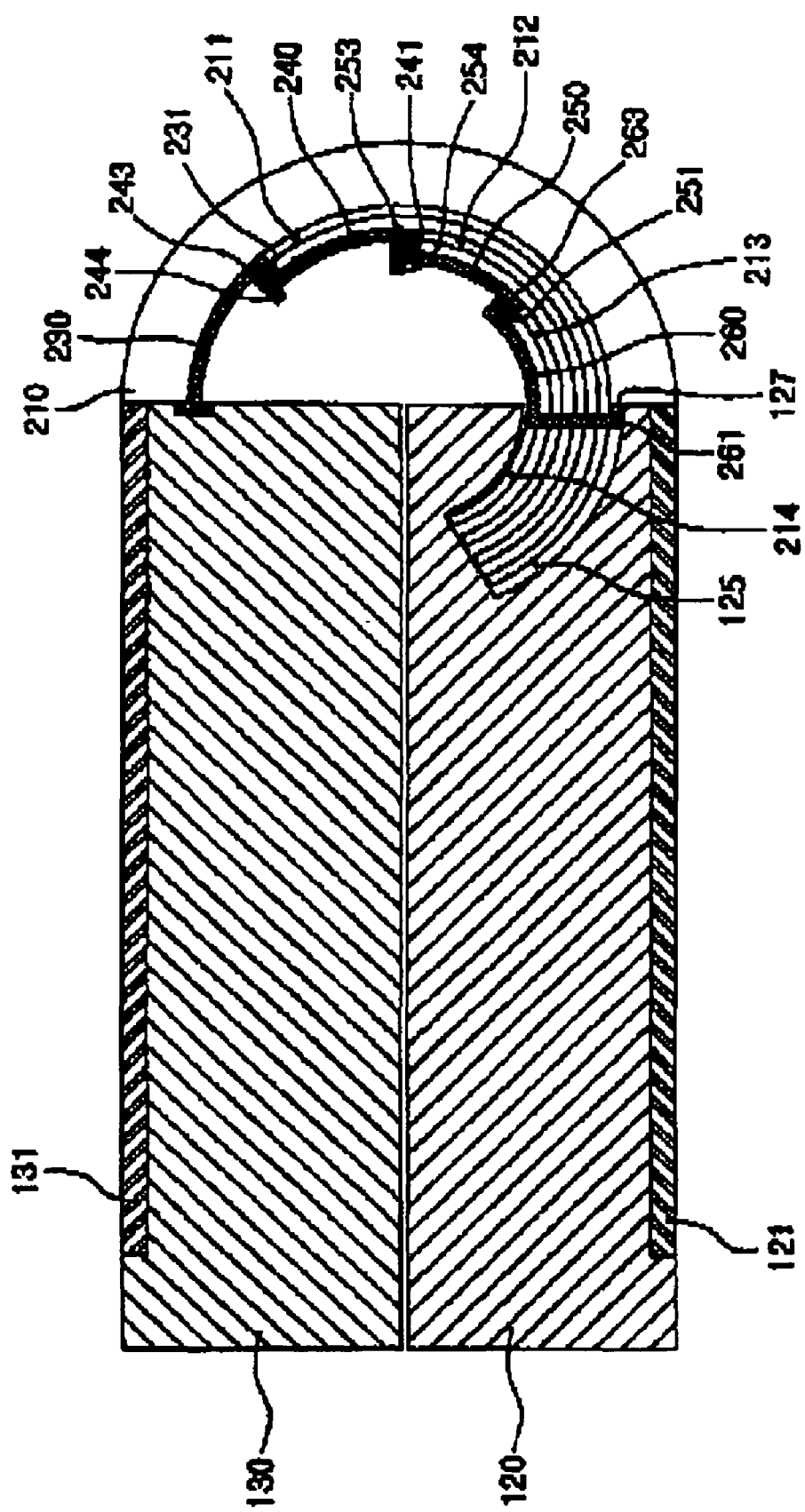
FIG. 12 is a cross-sectional view of folding slide doors when sub-display panel unit shown in FIGS. 9 to 11 is folded.
Figure 13:
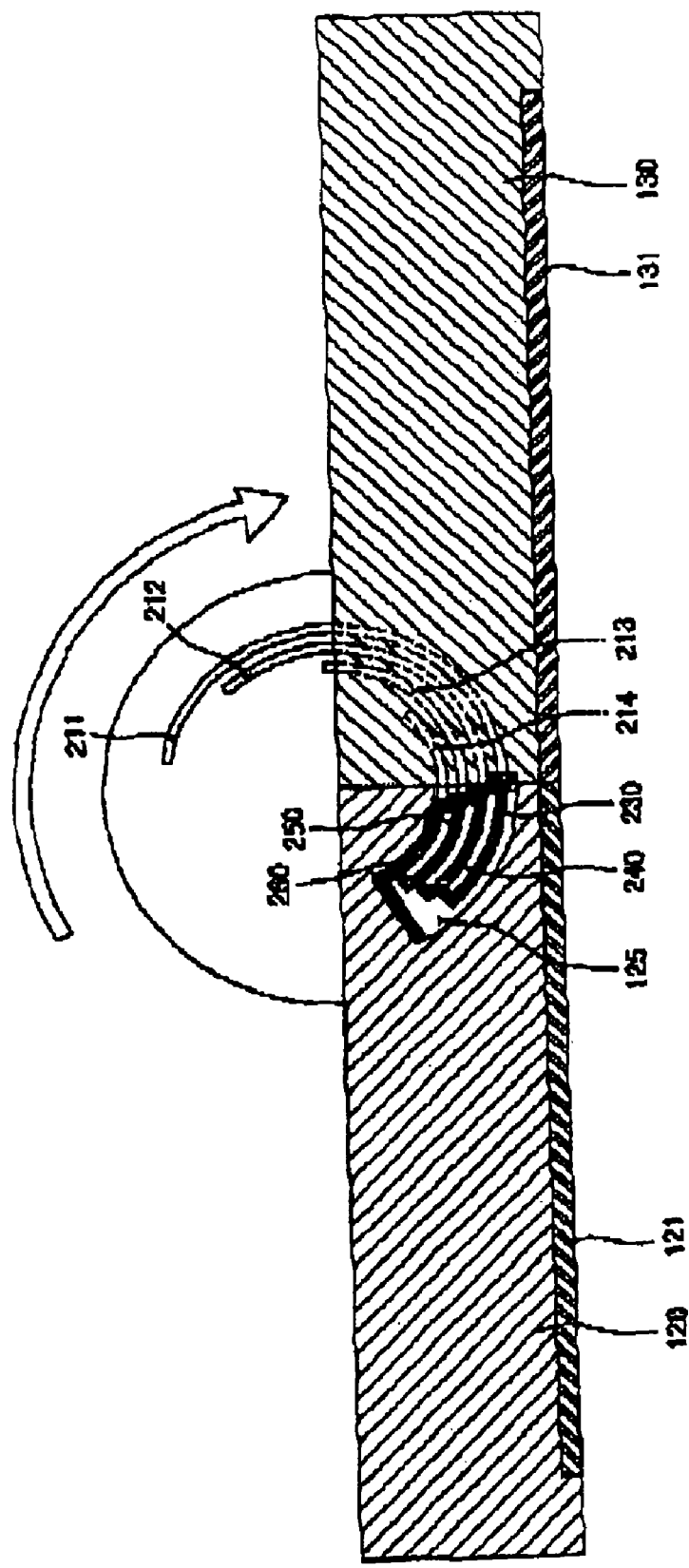
FIG. 13 is a cross-sectional view of folding slide doors when sub-display panel unit shown in FIGS. 9 to 11 is unfolded.

FIG. 12 and FIG. 13 are cross-sectional views showing the state of each of the folding slide doors 230-260 when the sub-display panel unit 130 is folded or unfolded. FIG. 12 is a cross-sectional view showing the state of each of the folding slide doors 230-260 when the sub-display panel unit 130 is folded, and FIG. 13 is a cross-sectional view showing the state of each of the folding slide doors 230-260 when the sub-display panel unit 130 is unfolded.

As illustrated in FIG. 12, when sub-display panel unit 130 is folded, a bridging ledge 243 of the second folding slide door 240 is bridged with a bridging ledge 231 of the first folding slide door 230, and a bridging ledge 253 of the third folding slide door 250 is bridged with a bridging ledge 241 of the second folding slide door 240, and a bridging ledge 263 of the fourth folding slide door 260 is bridged with a bridging ledge 251 of the third folding slide door 250, and a bridging ledge 127 of the folding slide door inserting groove 125 is bridged with a bridging ledge 261 of the fourth folding slide door 260.

Furthermore, as shown in FIG. 13, when sub-display panel unit 130 is unfolded, each of the folding slide doors 230-260 is guided along the trajectory grooves 211-214, and all of them will be inserted into the folding slide door inserting groove 125.

Here, the main display panel 121 provided in main display panel unit 120 and the sub-display panel 131 provided in sub-display panel unit 130 will be closely adhered to form a screen without a gap. As a result, it is possible to display an integrated large screen through two display panels 121, 131 while displaying a large screen.

Figure 14:
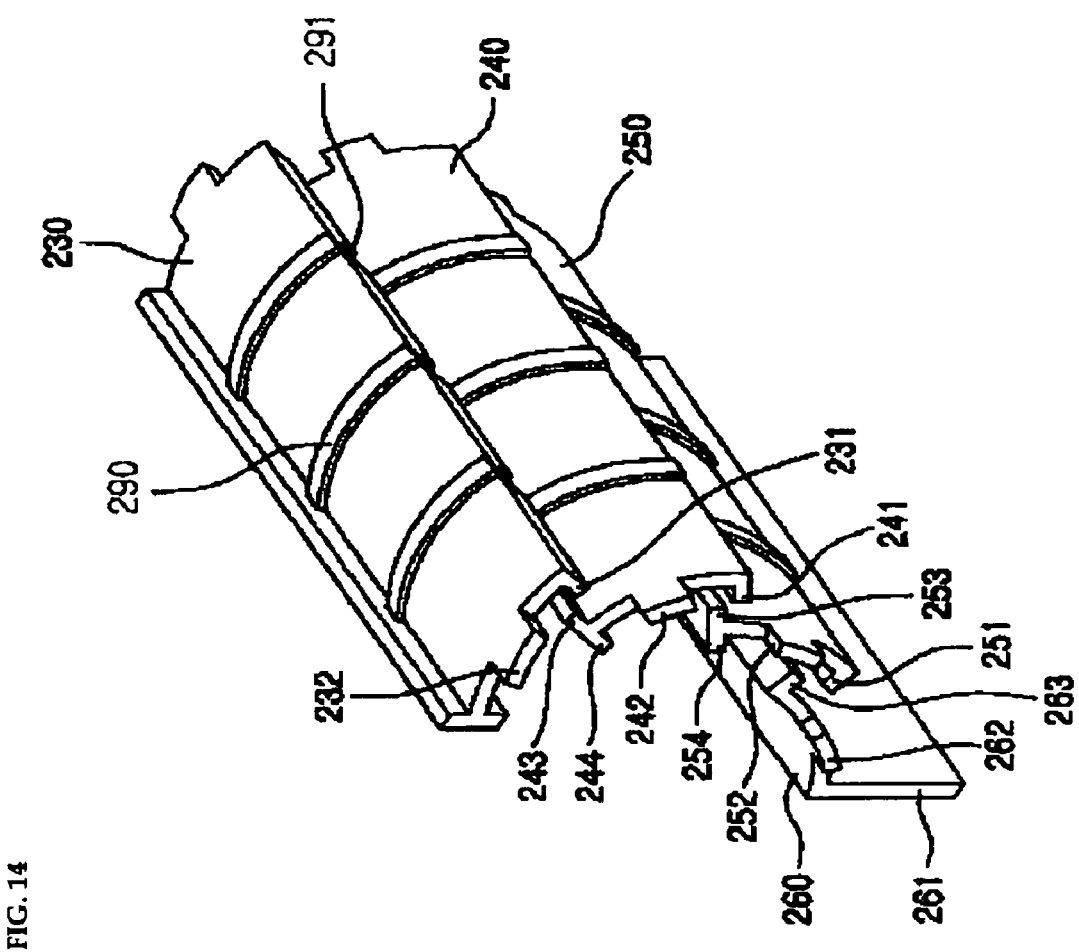
FIG. 14 is an exploded perspective view of folding slide doors shown in FIGS. 9 to 11 in which a reinforcement frame is provided respectively.

On the other hand, each of the folding slide doors 230-260 as mentioned above is made of a plate body having a predetermined curvature, and thus may be subject to structural breakage. Accordingly, as illustrated in FIG. 14, a plurality of reinforcement frames 290 are provided for each of the folding slide doors 230-260, and also there are provided with a plurality of reinforcement frame inserting grooves 291 for inserting the reinforcement frames 290 through hook members 231-251 of the first through the third folding slide doors 230-250 to eliminate interference caused by this reinforcement frames 290 when they are folded, thereby reinforcing the strength of folding slide doors 230-260.

Figure 15:
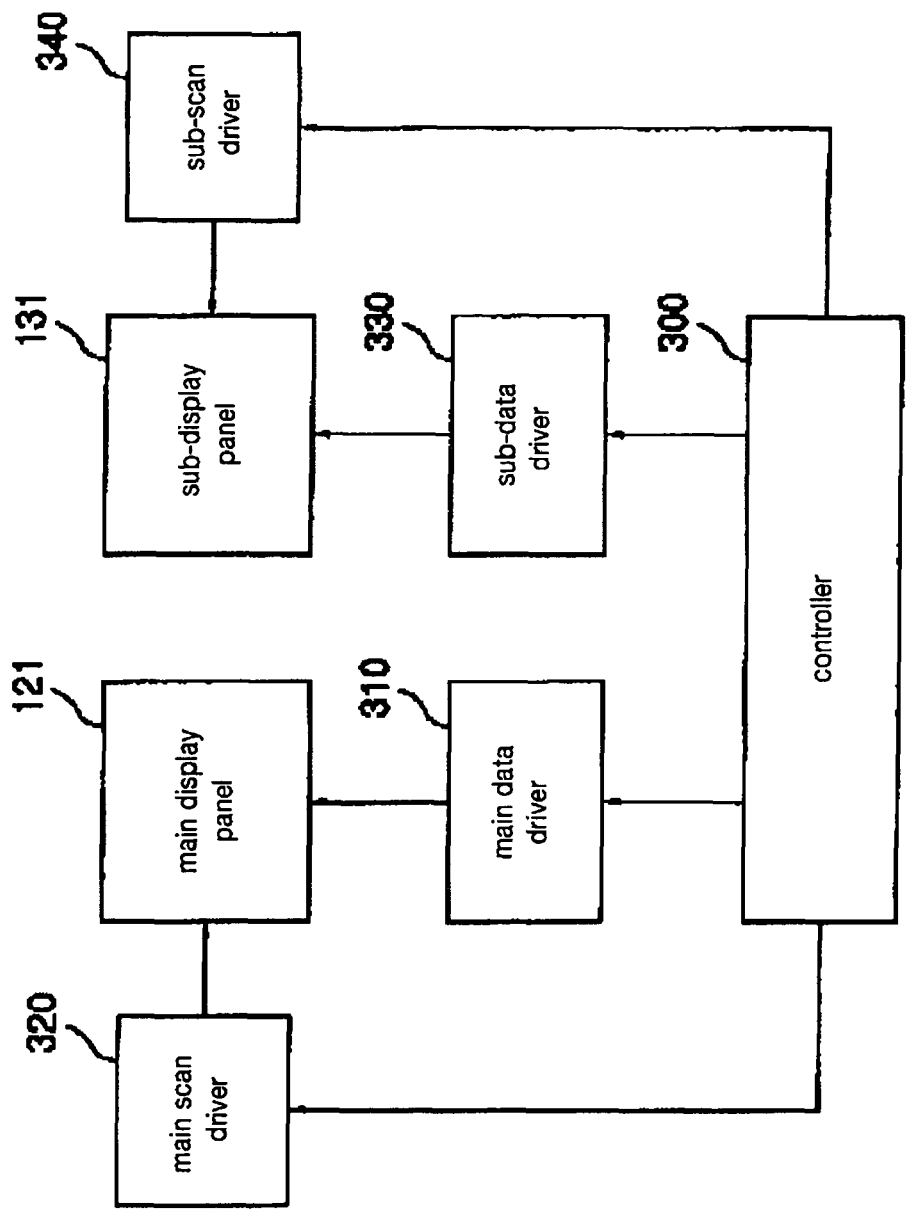
FIG. 15 is a block diagram of the display module of a large screen display device for portable terminal according to a preferred embodiment of the present invention.

FIG. 15 is a block diagram showing a display module construction of the portable terminal 100 according to an embodiment of the present invention. This display module is controlled to drive main display panel 121 and sub-display panel 131 independently when sub-display panel unit 130 is folded, and also it is controlled to display an expanded screen through main display panel 121 and sub-display panel 131 when sub-display panel unit 130 is unfolded.

As illustrated in FIG. 15, the construction of a display module includes a main display panel 121, a main scan driver 320, a main data driver 310, a sub-display panel 131, a sub-scan driver 340, a sub-data driver 330, and a controller 300.

In this case, main display panel 121, main scan driver 320, main data driver 310 and controller 300 are provided in the main display panel unit 120, but sub-display panel 131, sub-scan driver 340 and data driver 330 are provided in the sub-display panel unit 130.

Here, scan drivers 320, 340 and data drivers 310, 330 may be configured with several independent chips or a single chip according to its display screen size and production economy, but it is shown in this embodiment that scan drivers 320, 340 and data drivers 310, 330 are configured with several independent chips for the convenience of understanding.

The main display panel 121 is arranged in a matrix having a plurality of row lines and column lines to form a plurality of pixels, and the operation is controlled by main scan driver 320, main data driver 310, and controller 300.

The main scan driver 320 performs a scanning operation for sequentially selecting the row lines (Y-axis) of the main display panel 121, and the main data driver 310 converts image data to be displayed into voltage or current, and applies it to the column lines (X-axis) of the main display panel 121.

The sub-display panel 131 is arranged in a matrix having a plurality of row lines and column lines to form a plurality of pixels, and the operation is controlled by sub-scan driver 340, sub-data driver 330, and controller 300.

The sub-scan driver 340 performs a scanning operation for sequentially selecting the row lines (Y-axis) of sub-display panel 131, and the sub-data driver 330 converts image data to be displayed into voltage or current, and applies it to the column lines (X-axis) of sub-display panel 131.

The controller 300 performs a function for controlling the operation of main scan driver 320, sub-scan driver 340, main data driver 310, and sub-data driver 330 respectively by applying scan signals to the main scan driver 320 and the sub-scan driver 340 as well as applying image data signals to the main data driver 310 and the sub-data driver 330.

In this respect, function and effect of each display module as well as display operation and control method thereof while displaying an expanded large screen are disclosed in the application filed by this applicant bearing the title of "portable terminal having single extended screen for dual display panels, method of controlling screen display thereof and control device thereof" (Korean Patent Application No. 10-2003-0086441), which is incorporated herein by reference.

Figure 16:
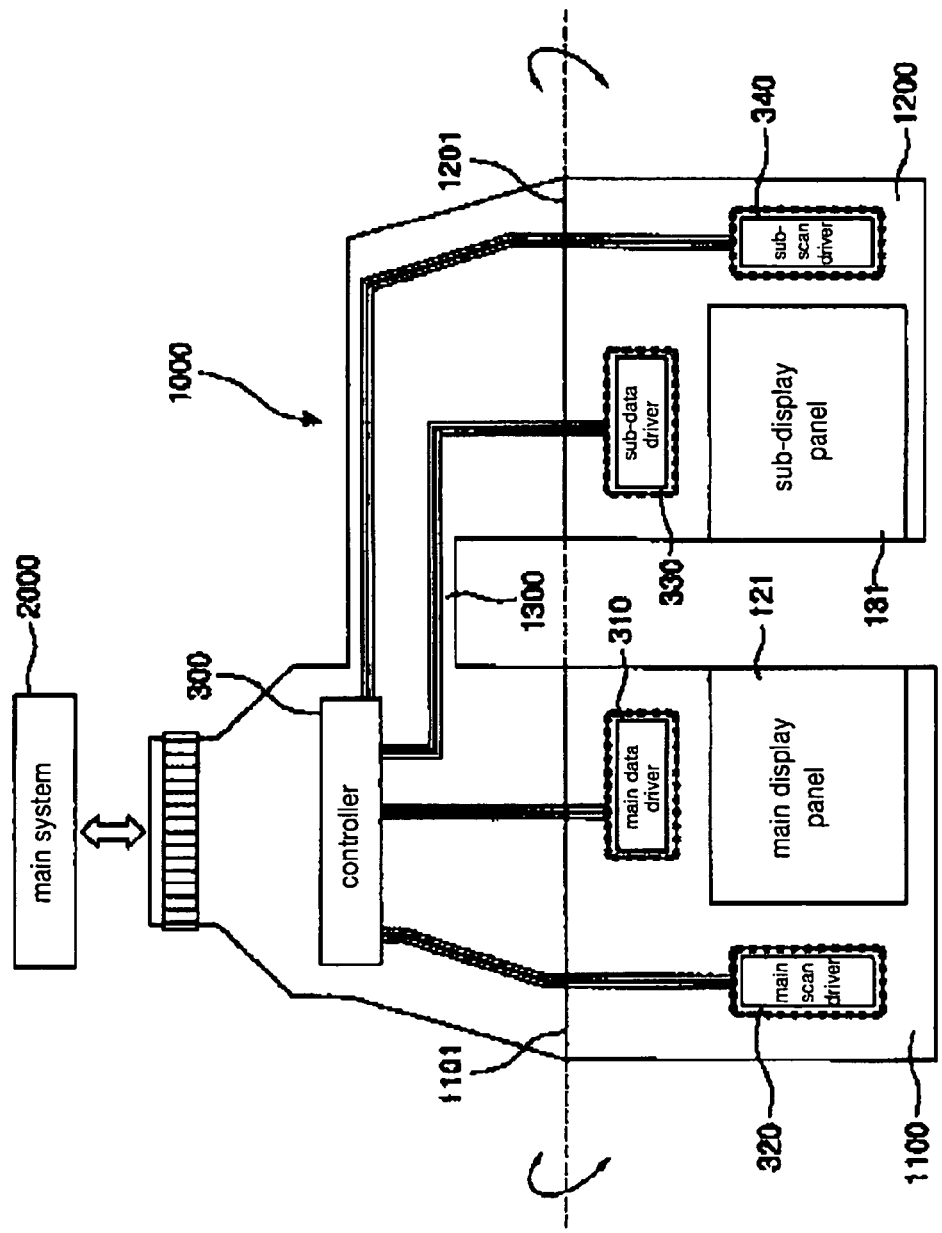
FIG. 16 is a plan view of showing a shape when a PCB film is inserted into a large screen display device.
Figure 17:
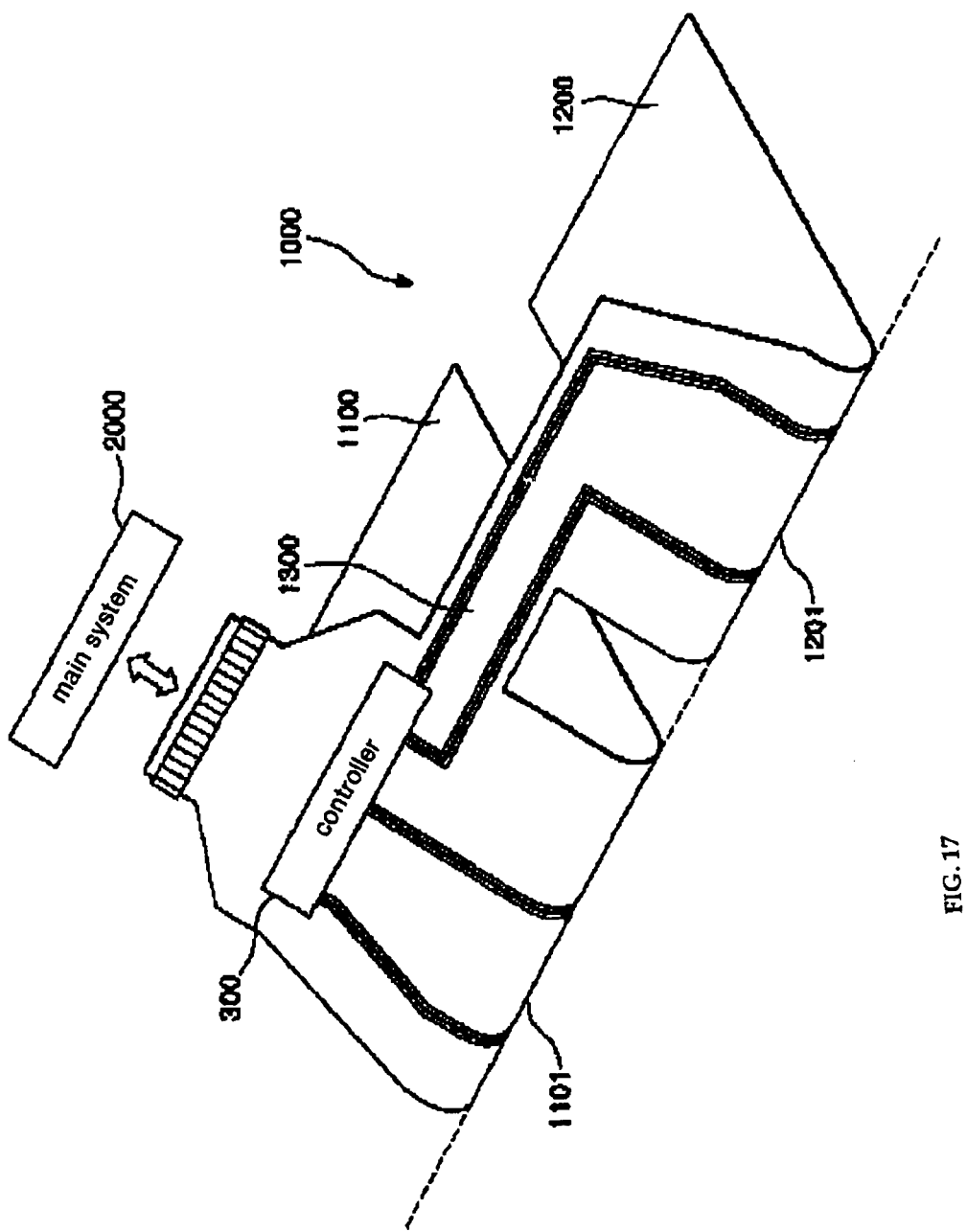
FIG. 17 is a perspective view showing a shape when the PCB film is folded according to a folding line shown in FIG. 16.

On the other hand, in order to provide wiring for exchanging data between these display modules, a PCB film should be inserted into the portable terminal 100. FIG. 16 and FIG. 17 are views showing a shape of PCB film portion being inserted into the portable terminal 100. FIG. 16 is a plan view illustrating a plane shape of PCB film 1000, and FIG. 17 is a perspective view showing a shape when it is folded with folding lines 1101, 1201 as illustrated in FIG. 16.

Here, the PCB film 1000 indicates a flexible IC package such as TCP (Tape Carrier Package), COF (Chip on Film) or the like.

As illustrated in FIG. 16, a single PCB film 1000 is inserted into portable terminal 100 to provide wiring between the respective display modules, and the PCB film 1000 includes a main film portion 1100, a sub-film portion 1200, and a connecting portion 1300.

As for the main film portion 1100, one side thereof is combined with controller 300 and the other side thereof is combined with main scan driver 320 and main data driver 310 for operating the main display panel 121 to perform wiring function for exchanging signals with main scan driver 320 and main data driver 310 through the controller 300. Furthermore, a wiring is provided to connect the controller 300 with a portable terminal main system 2000 of main body 110.

As for the sub-film portion 1200, one side thereof is combined with sub-scan driver 340 and sub-data driver 330 for operating the sub-display panel 131.

The connection portion 1300 connects the main film portion 1100 with the sub-film portion 1200 to perform wiring function for exchanging signals with sub-scan driver 340 and sub-data driver 330 through the controller 300.

Here, a first folding line 1101 is formed between a connection portion of the controller 300 and a connection portion of main scan driver 320 and main data driver 310 of the main film portion 1100 so as to insert PCB film 1000 into the device, and also a second folding line 1201 in parallel with the first folding line 1101 is formed between sub-scan driver 340 and sub-data driver 330 of the sub-film portion 1200 and the connection portion 1300.

Furthermore, main display panel 121 and sub-display panel 131 are connected to the corresponding data drivers 310, 330 and scan drivers 320, 340 through connecting pads respectively.

As illustrated in FIG. 17, it is seen that the PCB film 1000 is formed in a shape to be inserted into portable terminal 100 by folding with the first folding line 1101 and the second folding line 1201.

Figure 18:
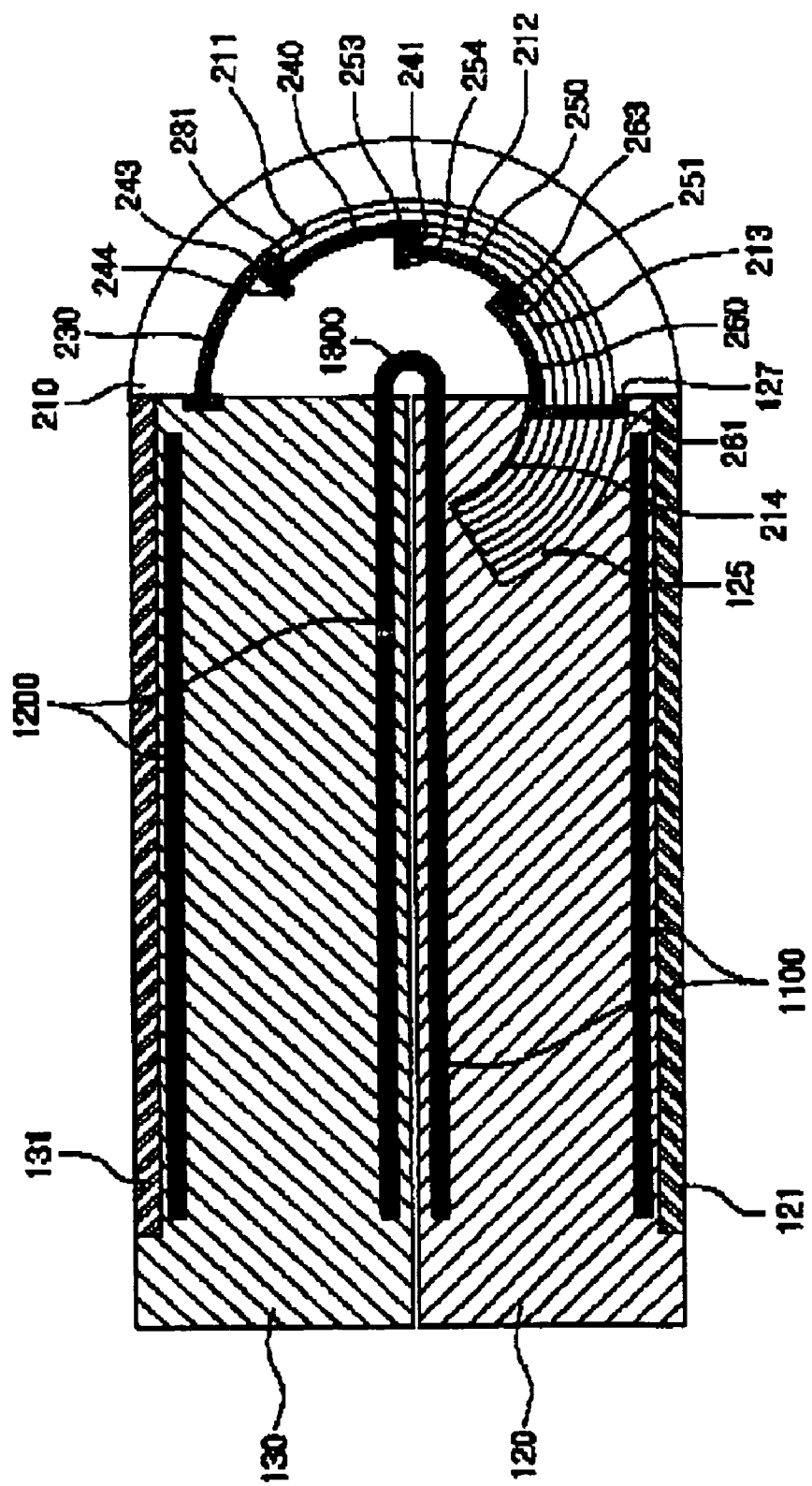
FIG. 18 is a cross-sectional view of the inserted PCB film when a sub-display panel unit is folded.
Figure 19:
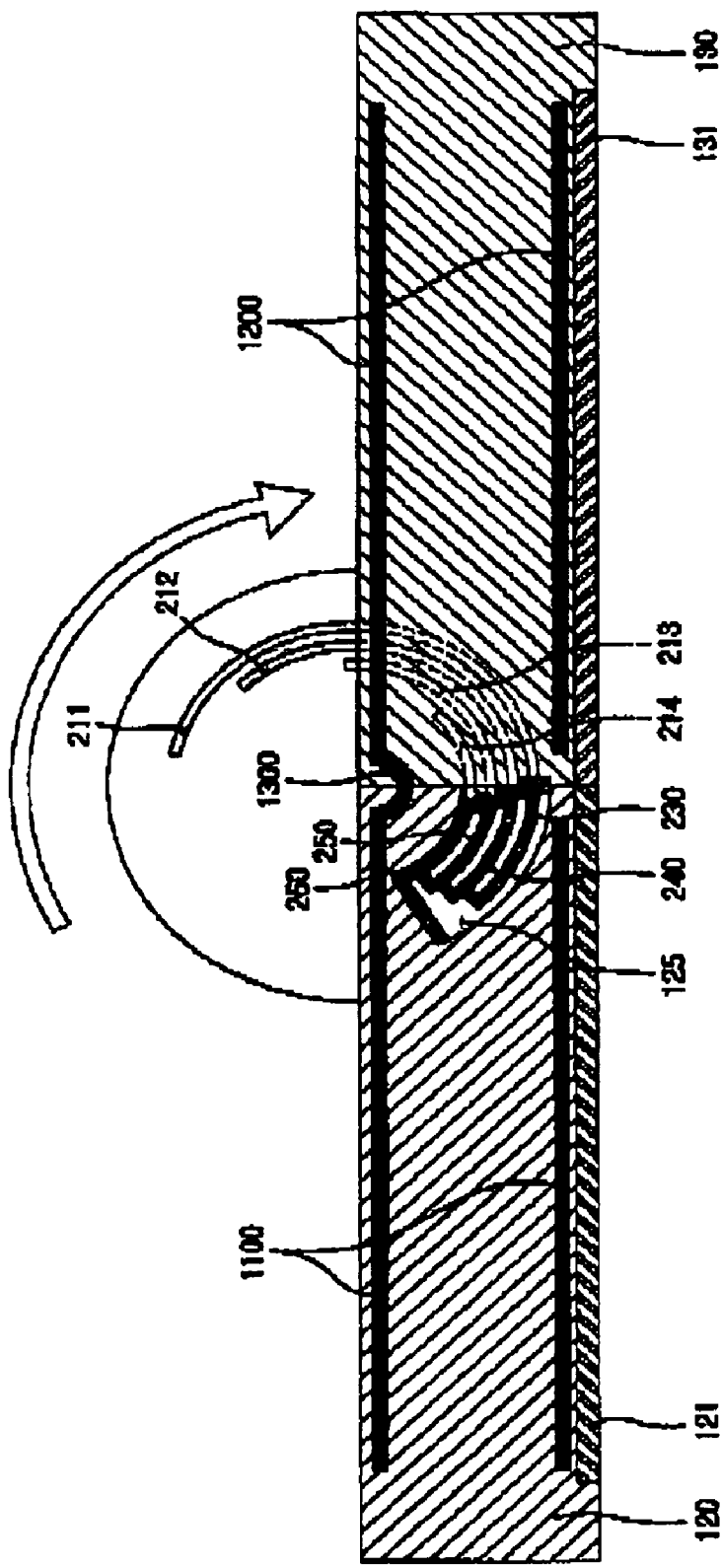
FIG. 19 is a cross-sectional view of the inserted PCB film when a sub-display panel unit is unfolded.

FIG. 18 and FIG. 19 are cross-sectional views showing a shape of the PCB film 1000 as illustrated in FIG. 16 and FIG. 17 to be inserted into portable terminal 100. FIG. 18 is a cross-sectional view showing a shape of the inserted PCB film when sub-display panel unit 130 is folded, and FIG. 19 is a cross-sectional view showing a shape of the inserted PCB film when sub-display panel unit 130 is unfolded.

As illustrated in FIG. 18, it is seen that main film portion 1100 of the PCB film 1000 is inserted into the inside of main display panel unit 120, and the sub-film portion 1200 is laid out in the inside of sub-display panel unit 130 in the state where the first folding line 1101 and the second folding line 1201 are folded.

Here, the connection portion 1300 for connecting main film portion 1100 with sub-film portion 1200 is inserted into a hinge unit 200 as shown in FIG. 18 and FIG. 19, and it is possible to transmit control signals from the controller 300 to sub-display panel unit 130 in either case when the sub-display panel unit 130 is folded or unfolded.

Moreover, a large screen display device with the more expanded concept can be constructed by connecting the sub-display panel unit 130 with another sub-display panel using the structure of the hinge unit 200 and the layout of PCB film 1000 in order to display a plurality of panels.

Figure 20:
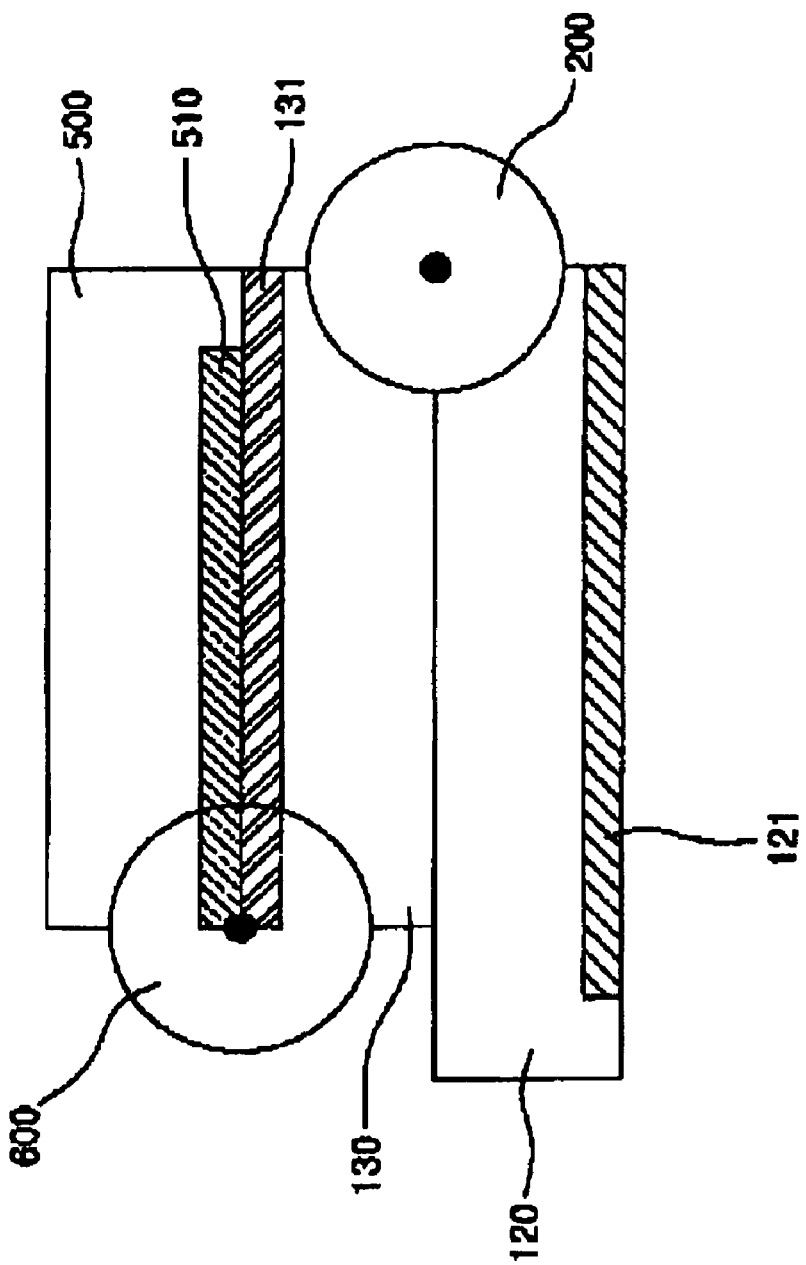
FIG. 20 is a conceptual view of the large screen display device folded, wherein a sub-display panel unit is connected with another sub-display panel unit.
Figure 21:
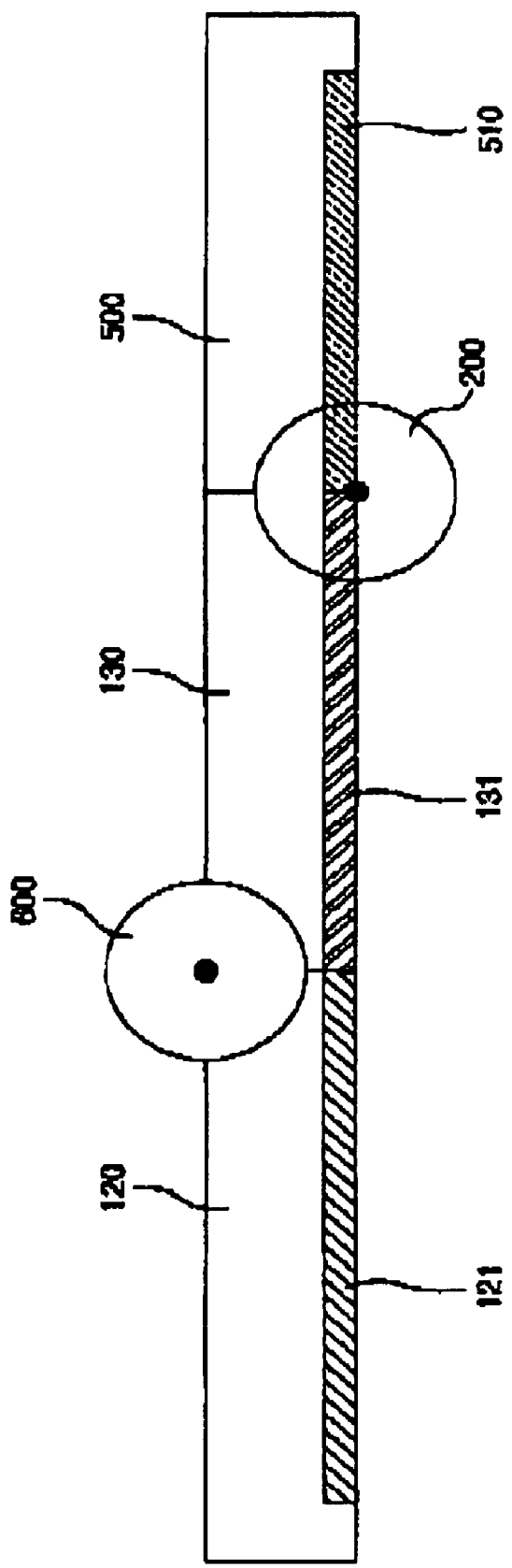
FIG. 21 is a conceptual view of the large screen display device whose sub-display panel units of FIG. 20 are unfolded.

FIG. 20 and FIG. 21 are conceptual views illustrating display panel units of portable terminal according to another embodiment of the present invention. FIG. 20 is a conceptual view illustrating a shape in which sub-display panel units 130, 500 are folded, and FIG. 21 is a conceptual view illustrating a shape in which sub-display panel units 130, 500 are unfolded.

As shown in FIG. 20, main display panel 121 is provided in the main display panel unit 120, and one side end of the main display panel unit 120 is combined with one side end of a first sub-display panel unit 130 through a first hinge combining unit 200, and the other side end of the first sub-display panel unit 130 is combined with one side end of a second sub-display panel unit 500 through a second hinge unit 600.

Here, the more expanded large screen can be displayed by forming a screen with main display panel 121, sub-display panel 131 and second sub-display panel 510 together, when the first sub-display panel unit 130 and the second sub-display panel unit 500 are unfolded.

Figure 22:
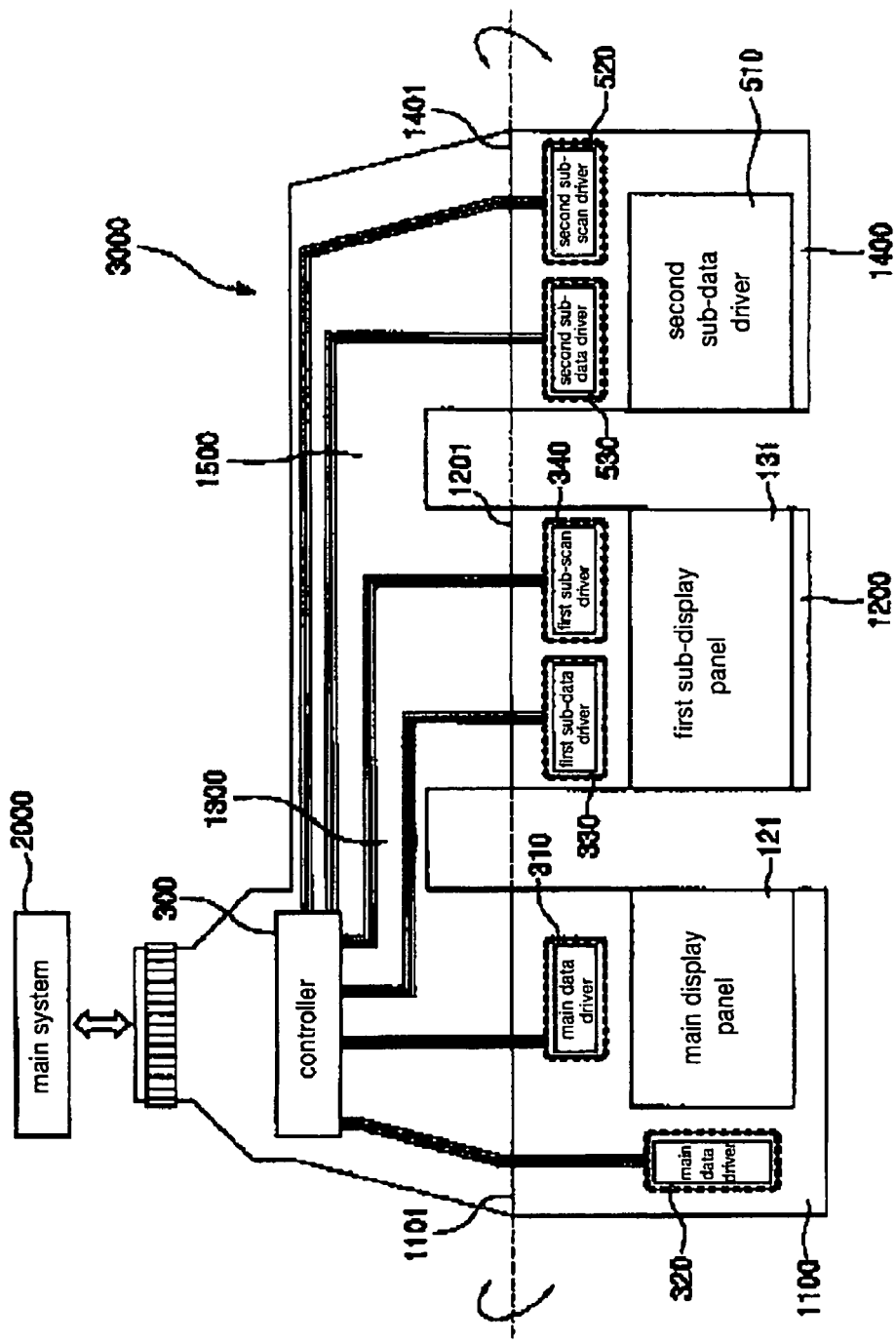
FIG. 22 is a plan view of a display module and a PCB film for the large screen display device shown in FIGS. 20 and 21.
Figure 23:
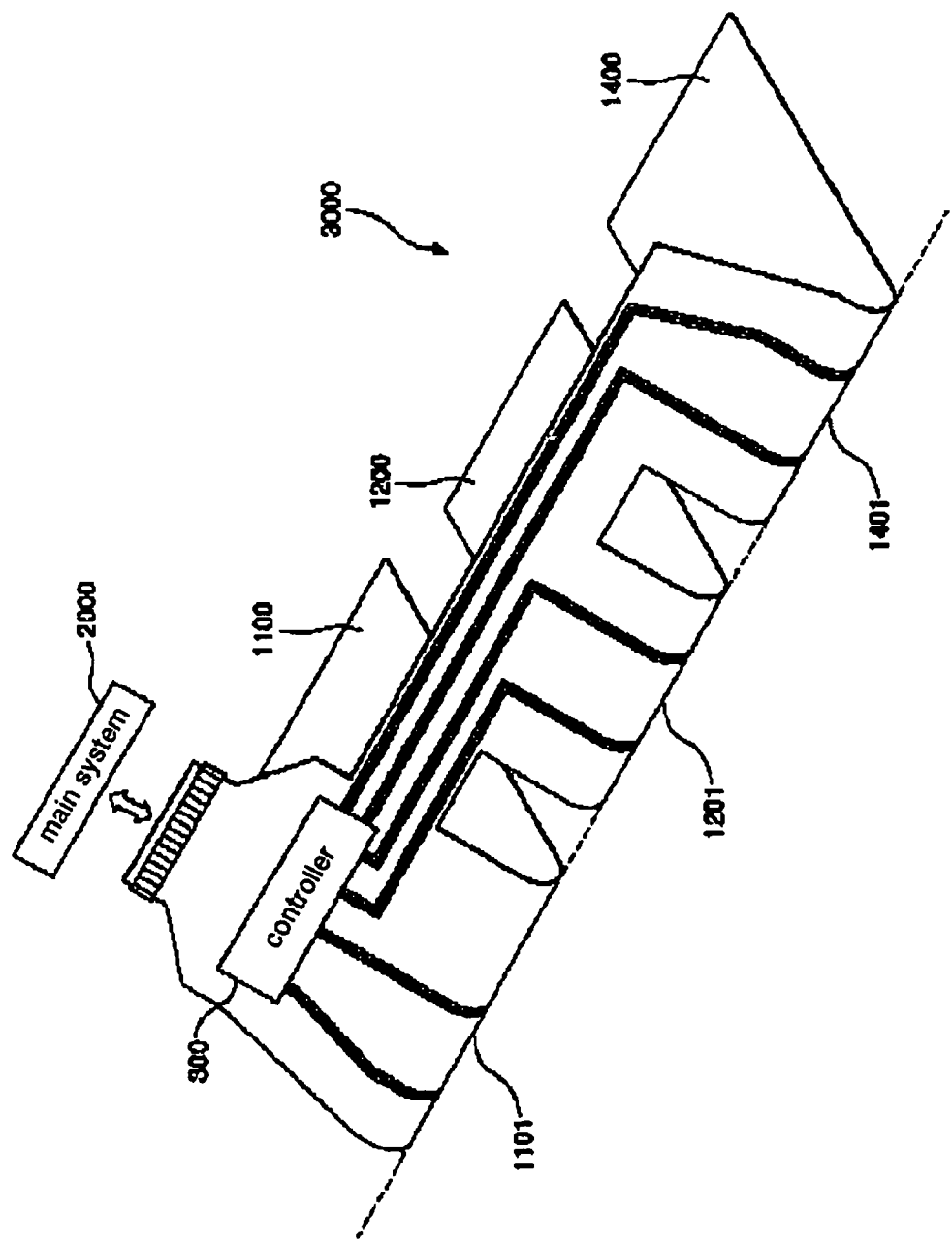
FIG. 23 is a perspective view showing a shape when the PCB film shown in FIG. 22 is folded.

FIG. 22 and FIG. 23 are views showing the construction of display module and a shape of PCB film in a large screen display device as illustrated in FIG. 20 and FIG. 21. FIG. 22 is a shape when it is unfolded with each of the folding lines 1101, 1201, 1401. FIG. 23 is a shape when it is folded with each of the folding lines 1101, 1201, 1401.

As illustrated in FIG. 22, the main display panel unit 120 including a main display panel 121, a main scan driver 320 and a main data driver 310, the first sub-display panel unit 130 including a first sub-display panel 131, a first sub-scan driver 340 and a first sub-data driver 330, and the second sub-display panel unit 500 including a second sub-display panel 510, a second sub-scan driver 530 and a second sub-data driver 520 are controlled by the controller 300 provided in the main display panel unit 120, and the controller 300 is connected to each of the display modules with a single PCB film 3000.

Here, the PCB film 3000 includes a main film portion 1100, a connection portion 1300, a sub-film portion 1200, a second connection portion 1500, and a second sub-film portion 1400.

As for the main film portion 1100, one side thereof is combined with a controller 300 and the other side thereof is combined with main scan driver 320 and main data driver 310 for operating the main display panel 121 to perform wiring function for exchanging signals with main scan driver 320 and main data driver 310 through the controller 300. Furthermore, wiring is provided to connect the controller 300 with a portable terminal main system 2000 of main body 110.

As for the first sub-film portion 1200, one side thereof is combined with the first sub-scan driver 340 and the first sub-data driver 330 for operating the first sub-display panel 131.

The first connection portion 1300 is provided to connect the main film portion 1100 with the first sub-film portion 1200 to perform wiring function for exchanging signals with the first sub-scan driver 340 and the first sub-data driver 330 through the controller 300.

Furthermore, as for the second sub-film portion 1400, one side thereof is combined with the second sub-scan driver 520 and the second sub-data driver 530 for operating the second sub-display panel 510.

The second connection portion 1500 is provided to connect the first sub-film portion 1200 with the second sub-film portion 1400 to perform wiring function for exchanging signals with the second sub-scan driver 520 and the second sub-data driver 530 through the controller 300.

Here, a first folding line 1101 is formed between a connection portion of the controller 300 and a connection portion of main scan driver 320 and main data driver 310 in the main film portion 1100 so as to insert the PCB film 3000 into the device, a second folding line 1201 in parallel with the first folding line 1101 is formed between the first sub-scan driver and first sub-data driver 340, 330 and the first connection portion 1300 in the first sub-film portion 1200, and a third folding line 1401 in parallel with the first folding line 1101 and the second folding line 1201 is formed between the second sub-scan driver and second sub-data driver 520, 530 and the second connection portion 1500 in the second sub-film portion 1400.

As illustrated in FIG. 23, it is seen that the PCB film 3000 is formed in a shape to be inserted into the device by folding with the first folding line 1101, the second folding line 1201 and the third folding line 1401.

Accordingly, it is possible to display an expanded large screen and provide high quality service that has not been possible with main display panel 121 and only one sub-display panel 131.

While the present invention has been described above in detail with reference to the preferred embodiments, it is to be appreciated that those skilled in the art can change or modify the invention in a variety of ways without departing from the scope and spirit of the present invention defined by the appended claims. Therefore, further modifications of the embodiments may be made without departing from the art of the present invention.

What is claimed is:

1. A portable terminal comprising:
   a first display panel unit for displaying a first image;
   a second display panel unit for displaying a second image;
   a first and a second trajectory disc being positioned opposite each other at one side of the first display panel unit, and formed with a plurality of trajectory grooves at one side thereof; and
   a folding slide door unit comprising a plurality of slide doors formed with guide protrusions at both lateral sides to be slidably inserted into the trajectory grooves of the first and the second trajectory discs, and slidably folded along the trajectory grooves, wherein the folding slide door unit is connected between the first display panel unit and the second display panel unit.

2. The portable terminal according to claim 1, wherein one side of the first and the second display panel units are combined so as to be closely adhered to each other when the second display panel unit is unfolded.

3. The portable terminal according to claim 1, the folding slide door unit comprising:
   a first folding slide door whose first lateral side is connected with the second display panel unit, and second lateral side on opposite to the first lateral side has a hook member,
   a second folding slide door whose first lateral side has a bridging ledge to be bridged by the hook member of the first folding slide door, and second lateral side on opposite to the first lateral side has a hook member,
   a third folding slide door whose first lateral side has a bridging ledge to be bridged by the hook member of the second folding slide door, and second lateral side on opposite to the first lateral side has a hook member,
   a fourth folding slide door whose first lateral side has a bridging ledge to be bridged by the hook member of the third folding slide door, and second lateral side on opposite to the first lateral side has a hook member, and
   wherein a third and a fourth lateral sides opposite to each other in the first through the fourth folding slide doors have guide protrusions to be slidably inserted into the corresponding trajectory grooves of the first and the second trajectory discs.

4. The portable terminal according to claim 3, wherein the first through the fourth folding slide doors are formed with a plurality of reinforcement frames to prevent breakage, and hook members of the first through the third folding slide doors are formed with a plurality of reinforcement frame inserting holes through which the reinforcement frames provided in the second through the fourth folding slide doors can be inserted respectively.

5. The portable terminal according to claim 3, wherein the first display panel unit is formed with groove for inserting the folding slide doors, and a bridging ledge is formed at one portion of the groove to be bridged by the hook member of the fourth folding slide door.

6. The portable terminal according to claim 1, wherein the hinge unit further includes a first and a second rotary supporting disc formed at one lateral side of the second display panel unit opposite to each other for supporting the first and the second trajectory discs to be rotational.

7. A portable terminal, comprising:
   a plurality of display panel units, each display panel unit operable to display an image;
   at least one hinge structure, each hinge structure being formed between adjacent display panel units and each hinge structure including,
      first and second trajectory discs positioned adjacent one another at one side of one of the adjacent display panel units, each first and second trajectory disc including a plurality of trajectory grooves formed on one side of the disc, and the side of each first trajectory disc including the trajectory grooves being positioned opposing the side of the corresponding second trajectory disc containing trajectory grooves; and
      a folding slide door unit connected between the adjacent display panel units, each folding slide door unit including a plurality of slide doors, each slide door including a guide protrusion formed at each lateral end and the guide protrusions being adapted to be slidably inserted into the trajectory grooves of a respective one of the corresponding first and the second trajectory discs to slidably move along the trajectory grooves.

8. The portable terminal of claim 7, wherein each hinge structure is operable when unfolded to position adjacent the display panel units next to each other to enable a single image to be displayed on all the display panel units.

9. The portable terminal of claim 7, wherein the terminal includes two display panel units and one hinge structure positioned between the display panel units.

10. The portable terminal of claim 7, wherein each folding slide door unit comprises:
   a first folding slide door having a first side connected to one of the adjacent display panel units and a second side opposite the first side and having a hook member;
   a second folding slide door having a first side with a bridging ledge adapted to interlock with the hook member of the first folding slide door, and the second folding slide door having a second side opposite the first side and having a hook member;
   a third folding slide door having a first side with a bridging ledge adapted to interlock with the hook member of the second folding slide door, and the third folding slide door having a second side opposite the first side and having a hook member; and
   a fourth folding slide door having a first side with a bridging ledge adapted to interlock with the hook member of the third folding slide door and the fourth folding slide door having a second side opposite the first side that is connected to the other one of the adjacent display panel units.

11. The portable terminal of 10, wherein each of the folding slide doors includes a plurality of arcuate reinforcement frames and wherein the hook members of the first through the third folding slide doors include a plurality of reinforcement frame inserting grooves through which reinforcement frames of the adjacent folding slide doors can be inserted, respectively.

12. The portable terminal of claim 7, wherein each hinge structure further includes first and second rotary supporting discs formed at a side of one of the adjacent display panel units, the first and second rotary supporting discs being operable to rotationally support the first and second trajectory discs, respectively.

13. The portable terminal of claim 7, wherein the portable terminal comprises a cellular phone.

* * * * *